March 2, 1954 T. J. JUDGE 2,671,164

SWITCH AND SIGNAL CONTROL SYSTEM FOR RAILROADS

Filed Sept. 8, 1949 12 Sheets-Sheet 1

INVENTOR.
T. J. Judge,
BY Neil D. Preston,
his ATTORNEY

FIG. 12.

CODE CHART

| FUNCTION OF CODE | CODE CHARACTERS | | | | |
|---|---|---|---|---|---|
| | NO.1 | NO.2 | NO.3 | NO.4 | NO.5 |
| SIGNALS 10 & 14 | LS | LS | LS | | |
| SIGNAL 11 | LS | LS | SL | | |
| SIGNAL 12 | LS | SL | LS | | |
| SIGNALS 13 & 15 | LS | SL | SL | | |
| SWITCHES 2 & 3 | SL | LS | LS | | |
| SWITCH 4 | SL | LS | SL | | |
| SIGNAL RIGHT | | | | LS | SL |
| SIGNAL LEFT | | | | SL | LS |
| SIGNAL STOP | | | | SL | SL |
| CALL-ON | | | | LS | LS |
| SWITCH 3 NORMAL | | | | LS | |
| SWITCH 3 REVERSE | | | | SL | |
| SWITCH 2 OR 4 NORMAL | | | | | LS |
| SWITCH 2 OR 4 REVERSE | | | | | SL |

(LS)=LONG FOLLOWED BY SHORT
(SL)=SHORT FOLLOWED BY LONG

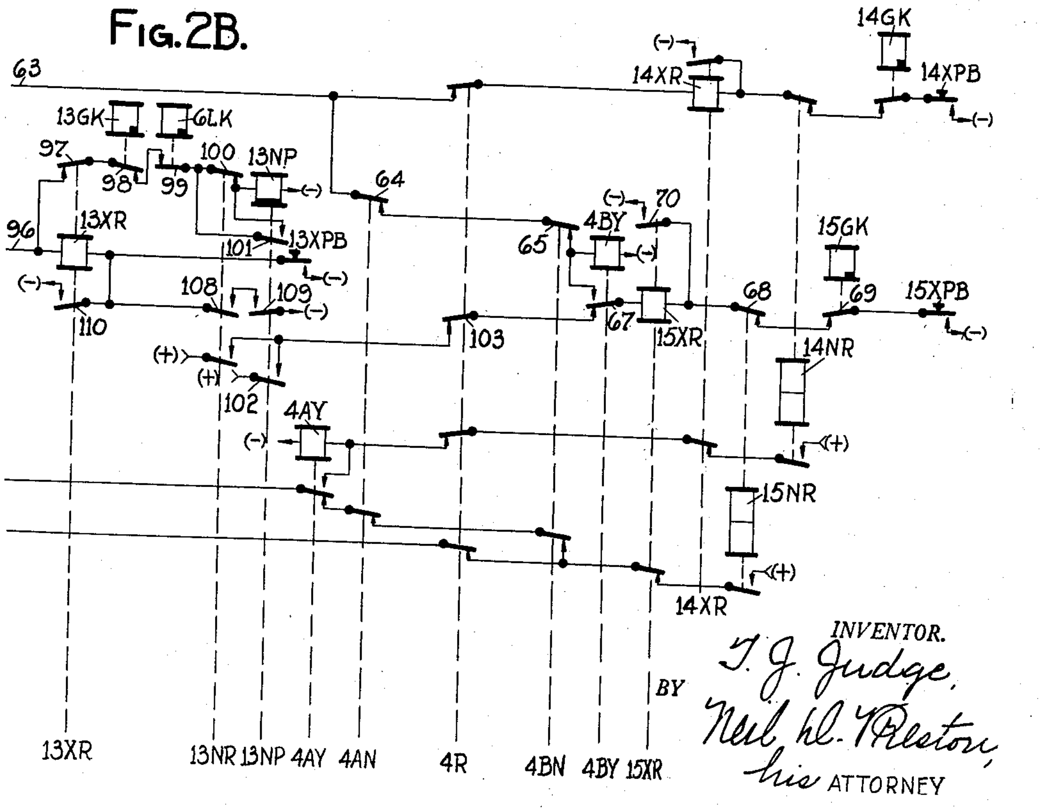
FIG. 2B.

INVENTOR.
T. J. Judge
BY Neil H. Preston
his ATTORNEY

INVENTOR.
T. J. Judge
BY Neil W. Preston
his ATTORNEY

March 2, 1954 T. J. JUDGE 2,671,164

SWITCH AND SIGNAL CONTROL SYSTEM FOR RAILROADS

Filed Sept. 8, 1949

12 Sheets-Sheet 4

INVENTOR.

T. J. Judge,

BY Neil D. Preston, his ATTORNEY

March 2, 1954 T. J. JUDGE 2,671,164
SWITCH AND SIGNAL CONTROL SYSTEM FOR RAILROADS
Filed Sept. 8, 1949 12 Sheets-Sheet 5

ARRANGEMENT OF DRAWINGS

INVENTOR.
T. J. Judge
BY Neil W. Preston
his ATTORNEY

March 2, 1954 T. J. JUDGE 2,671,164

SWITCH AND SIGNAL CONTROL SYSTEM FOR RAILROADS

Filed Sept. 8, 1949

12 Sheets-Sheet 6

INVENTOR.

T. J. Judge,

BY Neil W. Preston his ATTORNEY

March 2, 1954 T. J. JUDGE 2,671,164

SWITCH AND SIGNAL CONTROL SYSTEM FOR RAILROADS

Filed Sept. 8, 1949

12 Sheets-Sheet 7

Inventor
T. J. Judge
By
Neil W. Preston,
his Attorney

March 2, 1954 T. J. JUDGE 2,671,164

SWITCH AND SIGNAL CONTROL SYSTEM FOR RAILROADS

Filed Sept. 8, 1949

12 Sheets-Sheet 8

INVENTOR.
T. J. Judge,
BY Neil W. Preston
his ATTORNEY

March 2, 1954 T. J. JUDGE 2,671,164

SWITCH AND SIGNAL CONTROL SYSTEM FOR RAILROADS

Filed Sept. 8, 1949

12 Sheets-Sheet 9

INVENTOR.

T. J. Judge,

BY Neil W. Preston his ATTORNEY

INVENTOR.
T. J. Judge
BY Neil W. Preston
his ATTORNEY

March 2, 1954 T. J. JUDGE 2,671,164

SWITCH AND SIGNAL CONTROL SYSTEM FOR RAILROADS

Filed Sept. 8, 1949

12 Sheets-Sheet 11

INVENTOR.

T. J. Judge

BY Neil M. Preston his ATTORNEY

March 2, 1954

T. J. JUDGE 2,671,164

SWITCH AND SIGNAL CONTROL SYSTEM FOR RAILROADS

Filed Sept. 8, 1949

12 Sheets-Sheet 12

T. J. Judge, Inventor

By Neil W. Preston, his Attorney

Patented Mar. 2, 1954

2,671,164

UNITED STATES PATENT OFFICE 2,671,164

SWITCH AND SIGNAL CONTROL SYSTEM FOR RAILROADS

Thomas J. Judge, Madrid, Spain, assignor to General Railway Signal Company, Rochester, N. Y.

Application September 8, 1949, Serial No. 114,662

19 Claims. (Cl. 246—134)

This invention relates to switch and signal control systems for railroads and it more particularly pertains to such systems of the type where routes are automatically established in response to the manual designation of their respective entrance and exit ends.

This invention is to be considered as providing improvements in an entrance-exit switch and signal control system of the general type disclosed in my prior Patent No. 2,298,946, dated October 13, 1942. The nature of the system according to my prior patent and according to the present invention is to provide for the establishment of routes in response to entrance-exit designation in complex track layouts by the selective energization of switch position selecting relays provided for each of the respective crossovers and single track switches of the track layout, there being a definite number of relays required for each of the single track switches and crossovers, irrespective of the number of different routes thereover that may be established. The designation of the respective entrance and exit ends of the routes is accomplished by manual actuation of buttons which are preferably disposed on a track diagram at positions comparable to the respective entrance and exit points. The buttons may, however, be otherwise disposed as on a keyboard as disclosed in the prior application of N. D. Preston Ser. No. 791,371, filed December 12, 1947, now Pat. No. 2,649,536, dated August 18, 1953. Indications as to the routes that have been established and the conditions of the track switches are provided on the track diagram by the selective energization of indicator lamps and switch position indication means which may establish a substantially continuous line of light corresponding to each route according to the provisions of my above mentioned prior patent. In response to the energization of the switch position selecting relays, switch control relays are energized which in turn control the actuation of the respective switch machines of the associated crossovers and single track switches.

An object of the present invention is to check the response of the respective switch control relays to their respective switch position selecting relays as the respective routes are selected in response to manual designation.

Another object of the present invention is to render the selection of positions for the respective track switches effective for each route designated for one single track switch or crossover at a time, taken in sequence, starting from the exit end of the route, such selection being permitted to progress only provided that the switch control relays and the switch position selecting relays for each track switch are actuated in correspondence.

Another object of the present invention is to permit the execution of a control for clearing a signal governing entrance to a route, only provided that the switch position selecting relays and the associated switch control relays for each single track switch and each crossover in that route have been correspondingly conditioned.

Another object of the present invention is to transmit by code communication to a remote track layout switch and signal controls for each route having its entrance and exit ends designated at a control office, such switch controls being transmitted only provided that the switch control relays for the respective associated track switches in that route have been checked as being positioned in correspondence with the switch position selecting relays which are automatically conditioned in response to entrance-exit designation. The transmission of a signal control is dependent upon the checking of correspondence between the switch control relays and switch position selecting relays for all track switches included in a route that is designated.

Another object of the present invention is to transmit by code communication switch controls for the respective track switches of a designated route, only provided that a change is required to be made in the position of that track switch for alignment of that route. This is accomplished by maintaining the switch control relays at the control office in their last actuated positions, and unless there is a change in their positions required for a new route having its entrance and exit ends designated, there is no automatic start of the communication system for the transmission of a switch control for that track switch.

Another object of the present invention is to permit the clearing of a signal for governing entrance to a route in response to a signal control communicated during a cycle of operation of the code communication system, only provided that each switch control that has been communicated during the last preceding cycle of operation has been effective to actuate a field switch control relay in correspondence with the particular switch control code that has been received in the field.

Other objects, purposes and characteristic features of the present invention will be in part obvious from the accompanying drawings, and in part pointed out as the description of the invention progresses.

In describing the invention in detail, reference will be made to the accompanying drawings in which like reference characters designate corresponding parts throughout the several illustrations, in which those parts having similar features and functions are designated by like letter reference characters which are generally made distinctive by reason of preceding numerals representative of various switch and signal locations, and in which:

Fig. 1 illustrates a miniature track diagram having entrance and exit buttons disposed thereon for designation of the respective entrance and exit ends of routes to be established;

Figs. 2A and 2B when placed side by side illustrate an initiating circuit network for use in the selection of the positions of track switches in response to entrance-exit designation;

Figs. 3A, 3B, 3C and 3D when placed side by side illustrate a completion circuit network for switch position selection and switch control together with code communication means for communicating switch and signal controls when they have been selected in response to entrance-exit designation for routes to be established;

Figure 13:
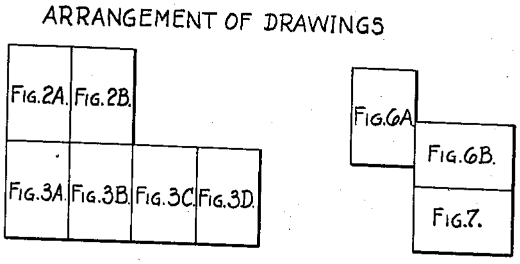
Figure 6A:
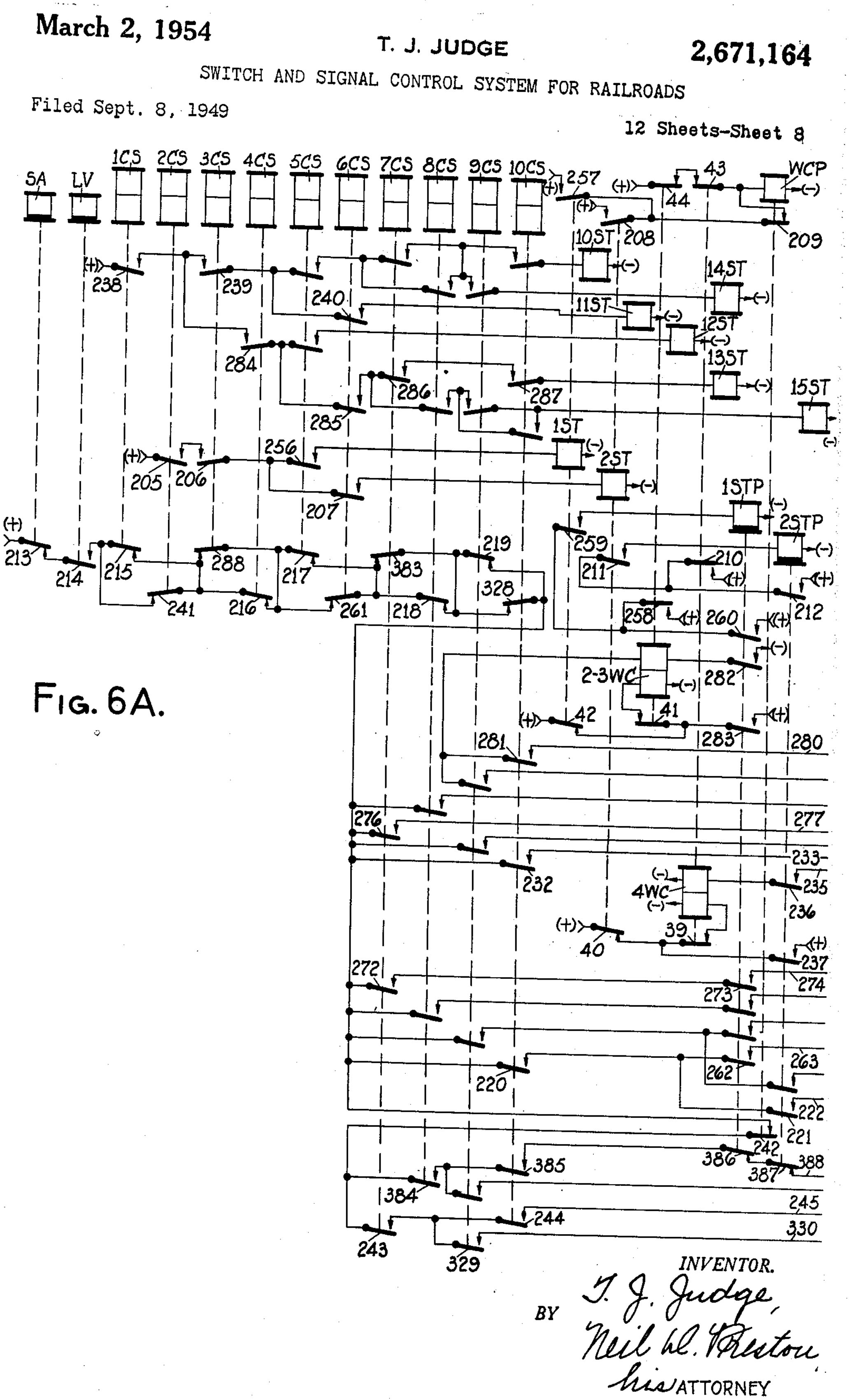
Figure 6B:
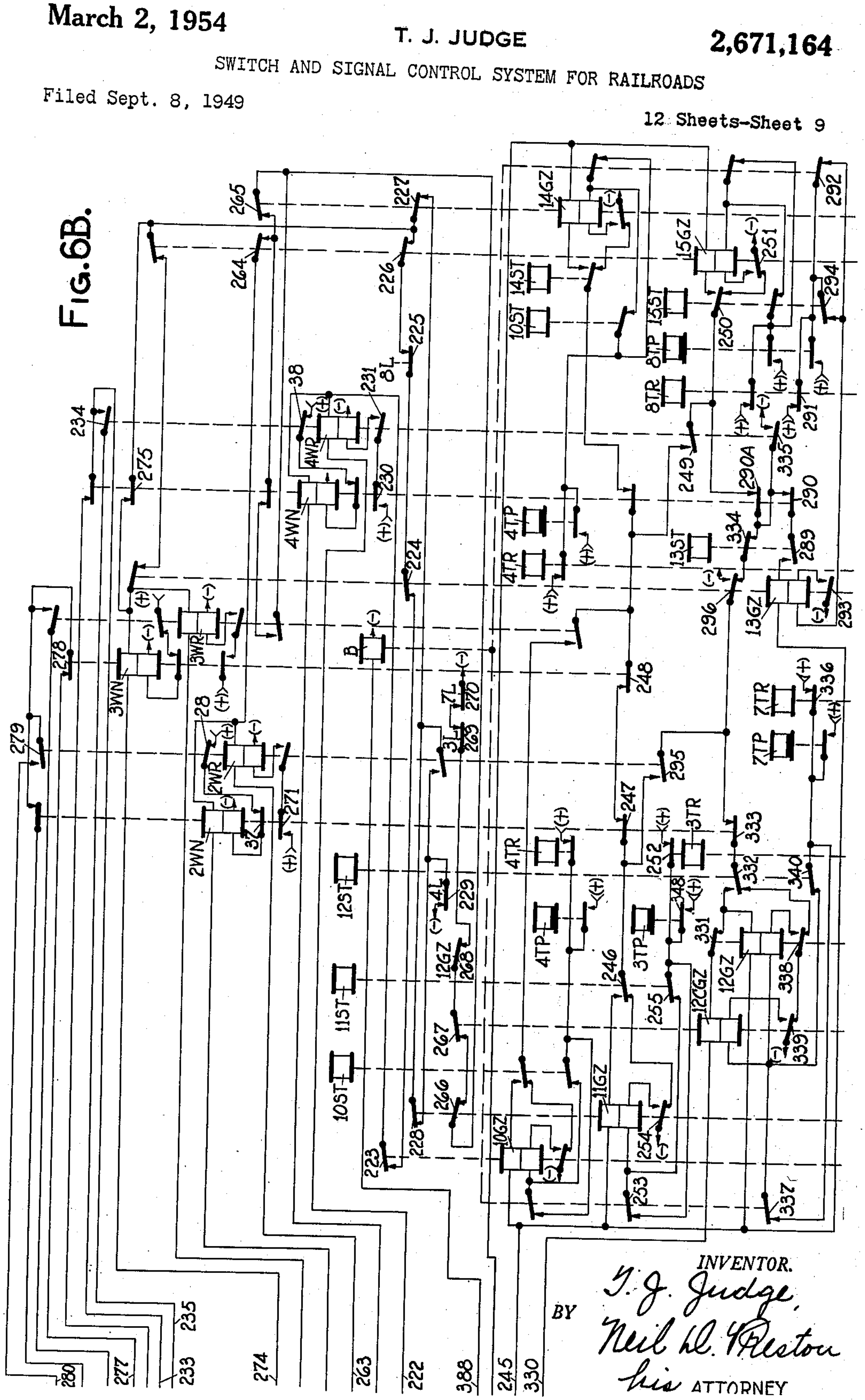
Figure 7:
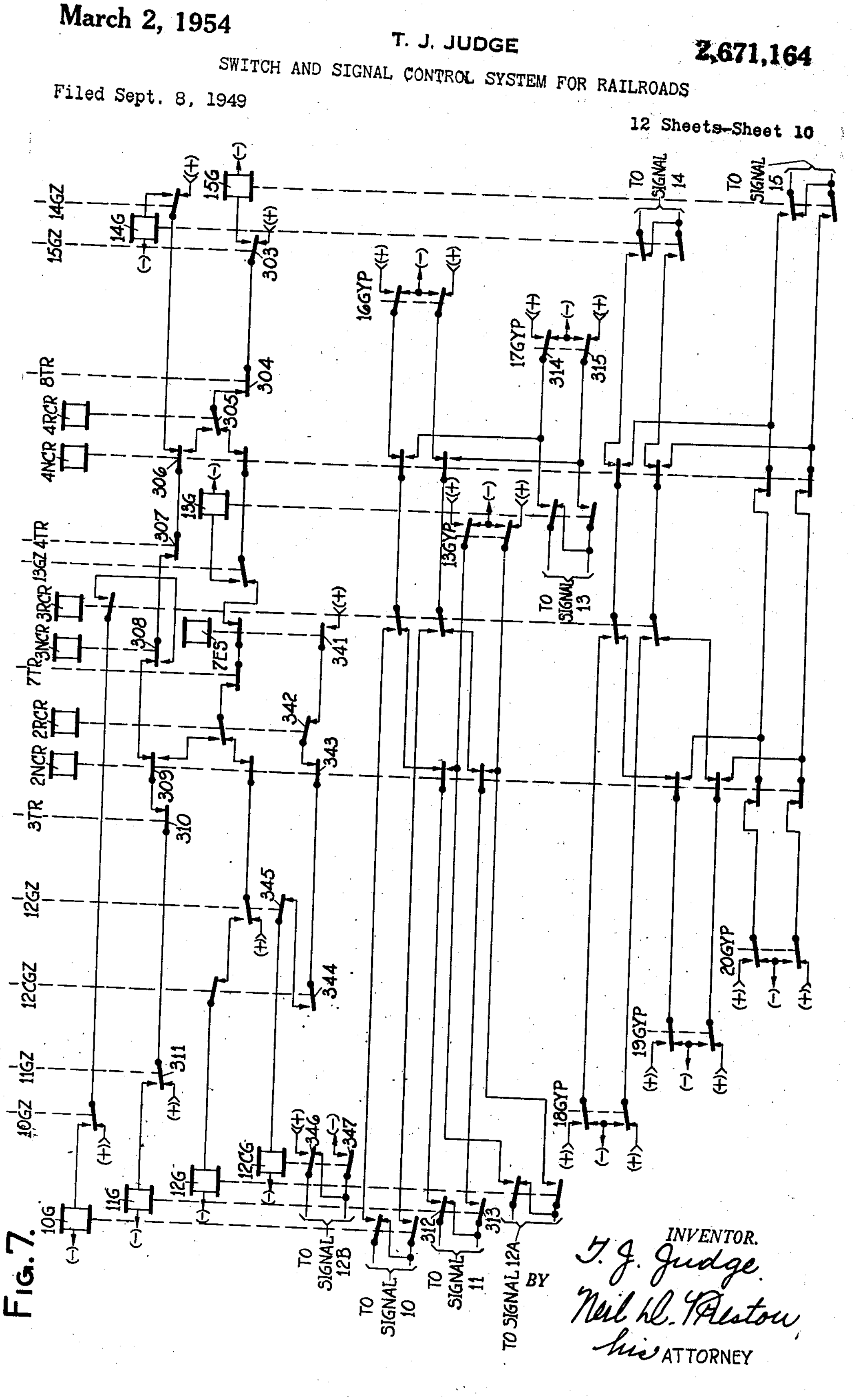
Figures 8, 9:
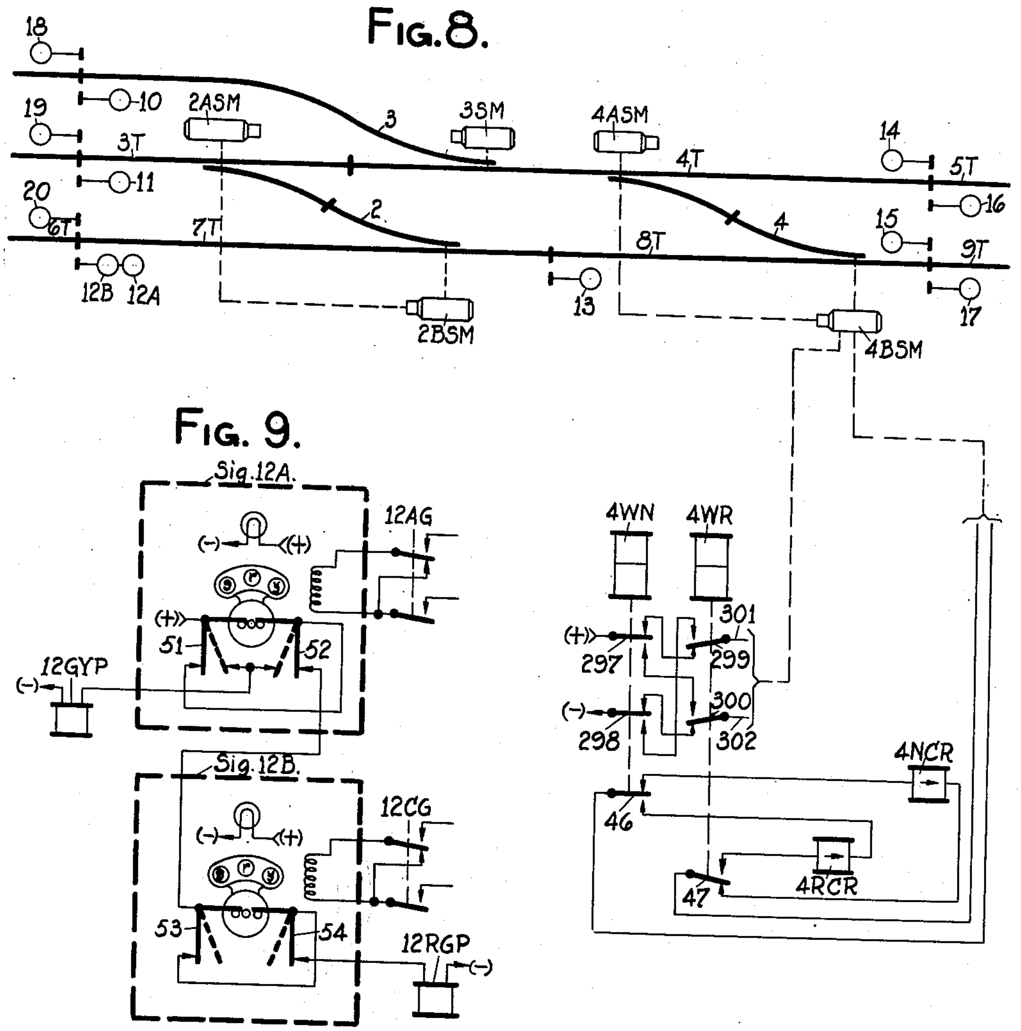
Figure 10:
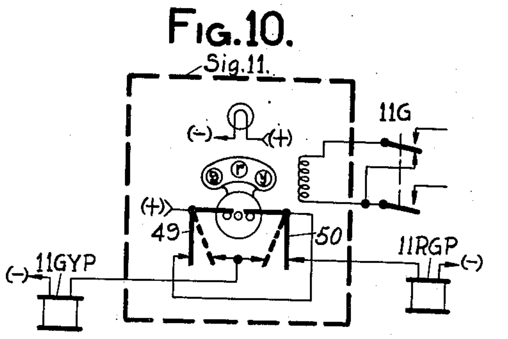
Figure 11:
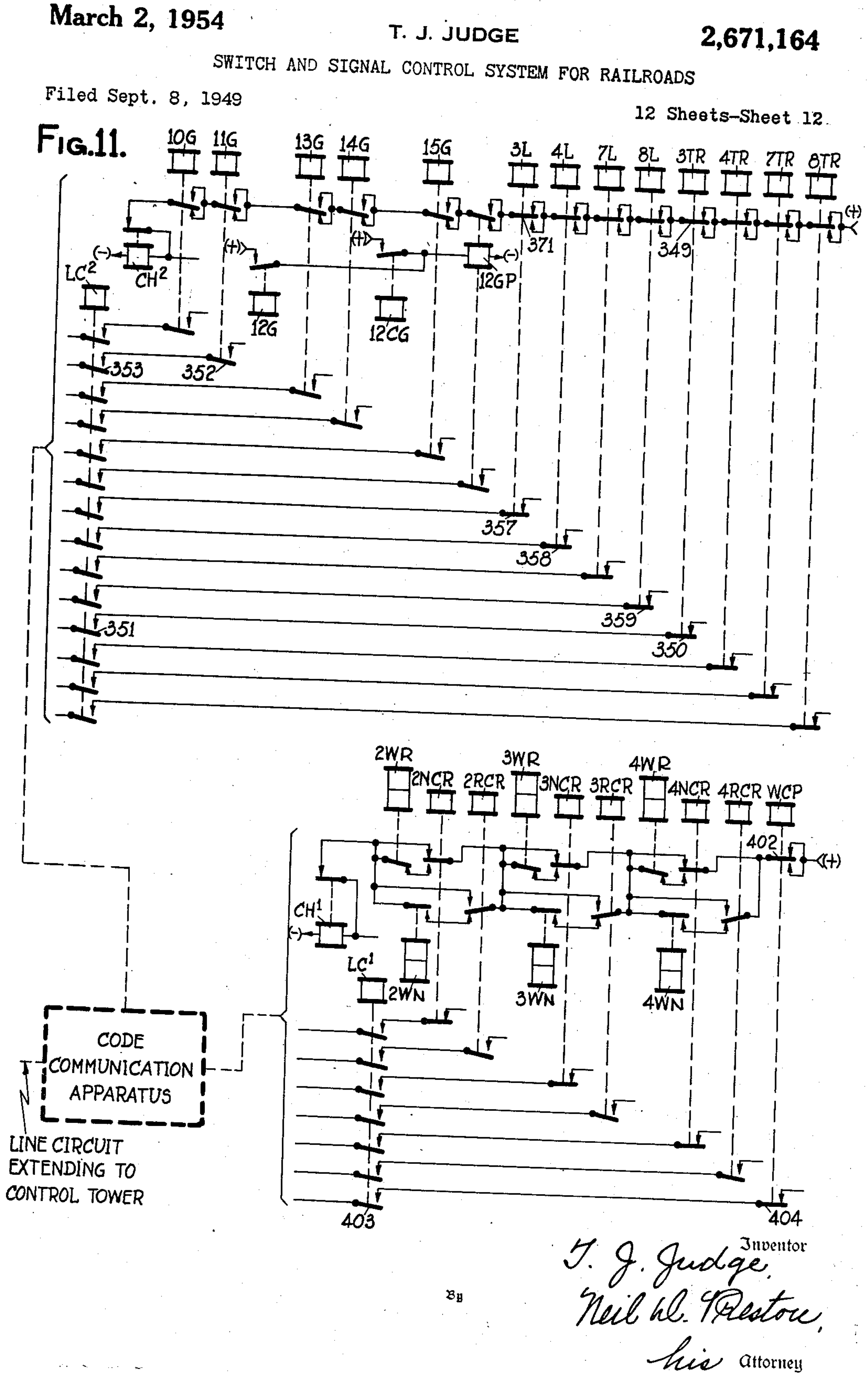

Figs. 6A and 6B when placed side by side illustrate a means for executing respective switch and signal controls at a field station in response to the transmission by code of such controls from a control office;

Fig. 7 illustrates a means for the control of signals in the field in accordance with switch and signal controls that are communicated to the field from the control office;

Fig. 8 illustrates the track layout for which the system is assumed to be provided for the embodiment herein disclosed, together with typical circuits relative to the power operation of the track switches;

Fig. 9 illustrates the control of the respective signal units and signal repeater relays for a typical signal adapted for providing either high signal or call-on indications;

Fig. 10 illustrates the control of a typical signal with its repeater relays where call-on controls are not employed;

Fig. 11 illustrates a system for the communication of indications from the field to the control office;

Fig. 12 is a code chart showing the use of respective code characters from the communication of switch and signal controls required for the establishment of any selected route through the track layout illustrated in Fig. 8; and Fig. 13 shows the relation between certain sheets of the drawings.

The embodiment chosen for the disclosure of the present invention has been particularly adapted to show typical conditions to be encountered in practice for the purpose of illustrating principles involved that may be applied to more complex track layouts rather than attempting to illustrate the scope of the present invention. Schematic circuit diagrams have been used in the conventional manner, rather than attempting to illustrate the actual construction and arrangement of parts that would be employed in practice. The symbols (+) and (—) are employed to indicate the positive and negative terminals respectively of suitable batteries of other sources of direct current, and the symbol (CL) has been used to designate the center tap of a battery used for polarized energization of magnetic stick relays. The symbols (LS) and (SL) are used to indicate code characters transmitted over the communication system, each character comprising a combination of a long and a short period, the symbol (LS) representing a code character having long and short periods respectively, and the symbols (SL) representing a code character having respectively short and long periods.

With reference to Fig. 8, the track layout chosen for this embodiment of the present invention comprises two parallel tracks interconnected by crossovers 2 and 4, and a third track connected by the single track switch 3 to the upper of the two main tracks as illustrated in Fig. 8.

Signals of the searchlight type such as is disclosed, for example, in the patent to O. S. Field No. 2,239,316, dated April 22, 1941, are illustrated as being located at points comparable to the respective entrance and exit ends of routes which may be established through the track layout. Signals 10, 11 and 12 are provided for governing entrance to the track layout by eastbound trains, signal 12 being illustrated as having a high signal 12A and a call-on signal 12B. The signals 14 and 15 are provided for governing entrance to the respective routes of the track layout for westbound traffic. The signal 13 is a signal for governing eastbound traffic located at an intermediate point in the track layout in the lower of the two main tracks as illustrated in Fig. 8. Exit from the track layout is governed by the signals 16, 17, 18, 19 and 20. Although the signals illustrated are of the searchlight type, it is to be understood that other types of signal such as semiphore, posilight, or light signals having individual color lamp units can be used in accordance with the requirements of practice.

For this embodiment of the present invention, it has been assumed that the track layout is located remote from a control tower, or control office, and that a code communication system is employed for the communication of controls and indications between the control office and the track layout. It is also assumed, that the code communication system employed is of the character disclosed, for example, in the patent to W. D. Hailes et al., Patent No. 2,399,734, dated May 7, 1946, but it is to be understood that other suitable types of code communication systems may be employed in accordance with the requirements of practice. Thus for simplification of the present disclosure, details incident to the code communication system as disclosed in that patent need not be considered, as reference can be made to the Hailes et al. patent for a disclosure of these details. For the purpose of facilitating reference to the Hailes et al. patent, the apparatus employed in this embodiment of the present invention corresponding to apparatus shown in that patent is identified by corresponding letter reference characters. In addition to change relays CH disclosed in the Hailes et al. patent as being used in the initiation of the system, relays ACH are associated with certain of the change relays CH at the control office for purposes relative to the initiation of the system for the transmission of switch controls from the control office to the track layout in a manner which will be more readily understood when considering the mode of operation of the system.

The relays LS and SL, as in the Hailes et al. patent are code determining relays which actually determine by their selective energization as to whether the code characters transmitted during a cycle of operation are respectively (LS) or (SL) characters. It is thus provided that the relays LS and SL are selectively energized during respective control cycles to transmit the control codes formed in accordance with the code chart of Fig. 12.

Figure 1:
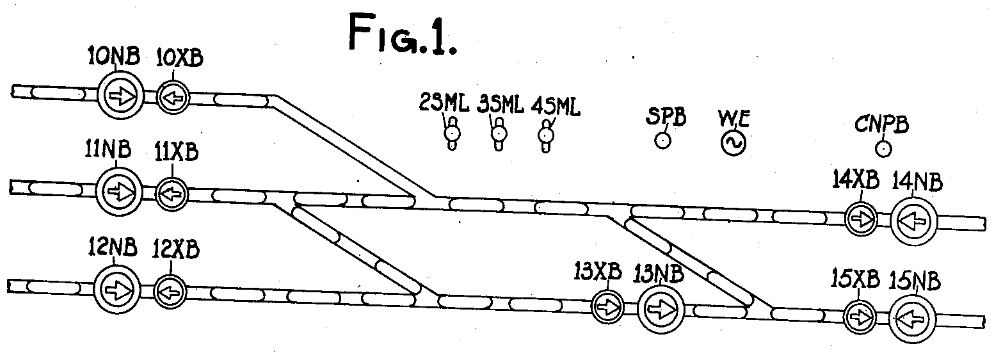

The designation of routes to be established is made by the actuation of respective entrance and exit control push buttons on a suitable control machine in the control office. The control machine has a control panel upon which is constructed a miniature track diagram (see Fig. 1) provided for the track layout (see Fig. 8). The construction of the track diagram is principally by translucent inserts where line of light indications are provided, the energization of the indicator lamps for the illumination of these inserts being provided in any suitable manner such, for example, as is disclosed in my above mentioned prior patent.

Entrance buttons NB and exit XB are provided on the diagram at points comparable to the ends of the routes as defined by the location of the signals in the track layout.

Each of the entrance buttons NB is of a push pull type being biased to a normal position from which it can either be depressed or pulled out. The depression of the button is used for designation of that entrance point for a route to be established, and the pulling out of the button is used for designation of restoration for a route having an entrance point at the associated signal location. As a means for designating a low speed call-on signal as distinguished from a high speed signal for a given signal location, it is provided that the entrance button NB for that location can be rotated to a distinctive operating position for designation of such call-on signal control. Therefore the button 12NB can be rotated in a counter-clockwise direction for designation of the call-on signal 12B at the associated entrance point. It is also provided that the rotation of the entrance button 12NB in the opposite direction from its normal position can be used to designate the entrance end for a route to be governed by a non-stick signal. Conditions incident to the actuation of the entrance button 12NB will be hereinafter considered in detail with respect to these distinctive positions as being typical of an organization that could be provided for other entrance points of the track layout in accordance with the requirements of practice. The structure of a control button to provide such distinctive operating positions can be provided, for example, as is shown in the prior patent to J. F. Merkel, Patent No. 2,305,185, dated December 15, 1942.

Each of the exit buttons XB is of the self-restoring type having a contact associated therewith which is closed only when such button is depressed from its normal biased position.

Although separate buttons are provided for designation of the respective entrance and exit points for each of the route ends, it is to be understood that the contacts of such buttons can be combined in a single button having the required number of distinctive positions, and that a single button can be used for each of the route ends if circuit means is provided associated therewith for supplying the distinctive conditions of entrance and exit designation, dependent, for example, upon the sequence of operation of the control buttons for the designation of the respective entrance and exit ends of the respective routes desired to be established.

An auxiliary switch control lever SML is provided on the control panel for each of the crossovers and each of the single track switches in order to facilitate the operation of the track switches to free them of obstructions such as snow and ice, and to provide an auxiliary means for the establishment of routes through the track layout. Each of the auxiliary switch control levers SML has a normal center position and two operating positions, one for operation of the associated track switch or track switches to normal positions, and the other for operation of such track switch or track switches to reverse positions.

Figure 5:
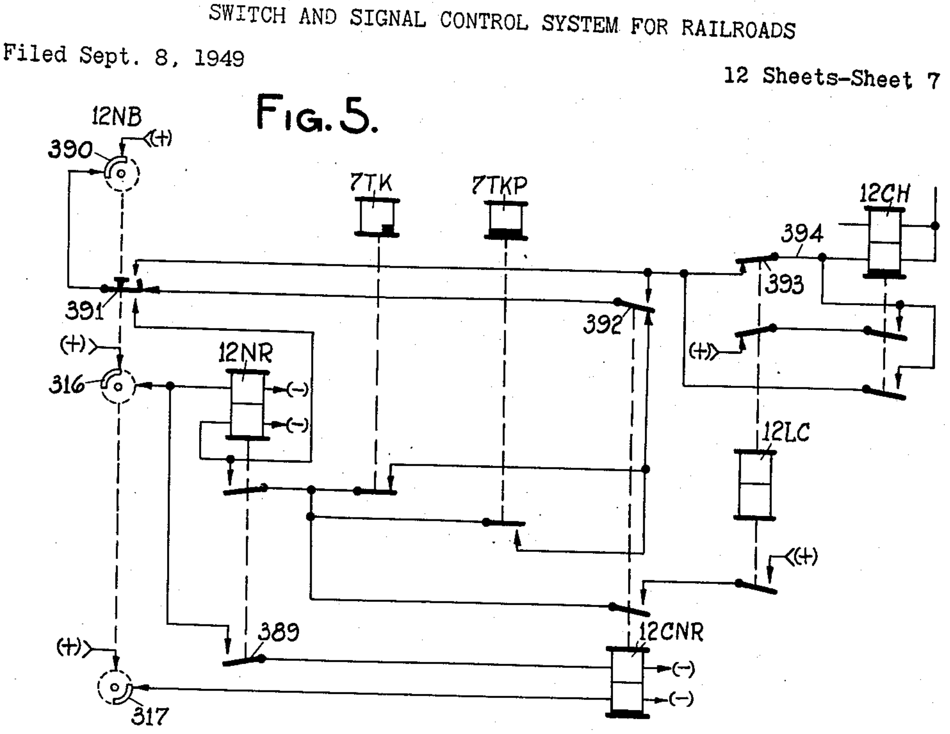
Fig. 5 illustrates another typical means for the control of an entrance relay in response to entrance designation which is particularly adapted for use where call-on signals are employed.

Respective entrance relays NR and exit relays XR are provided for the entrance and exit buttons. These relays are responsive to the actuation of the associated buttons when the entrance and exit ends of routes to be established are designated. Each of the entrance relays NR is provided with stick circuit energization so that it can be maintained picked up for stick signal control dependent upon the entrance of a train into a route emanating from that entrance point. Where a call-on signal is provided, another entrance relay CNR is provided as illustrated in Fig. 5 in addition to the regular entrance relay NR for that particular entrance point.

Figure 2A:
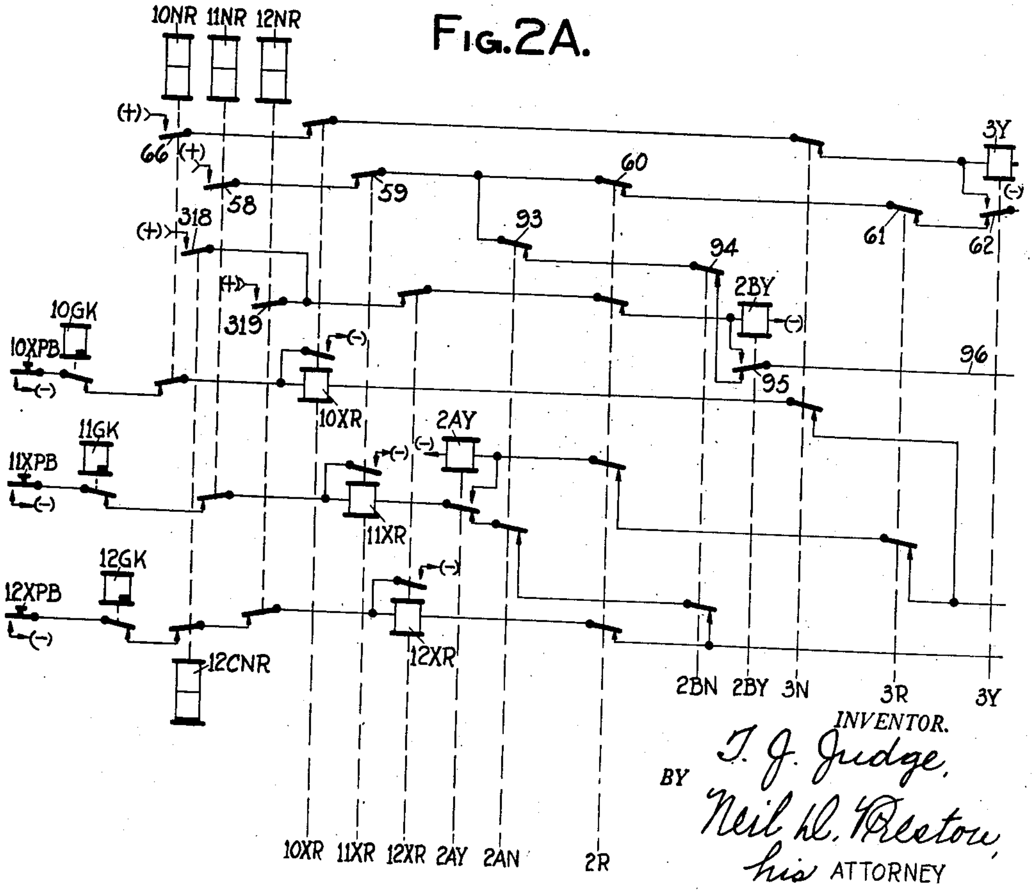
Figure 3A:
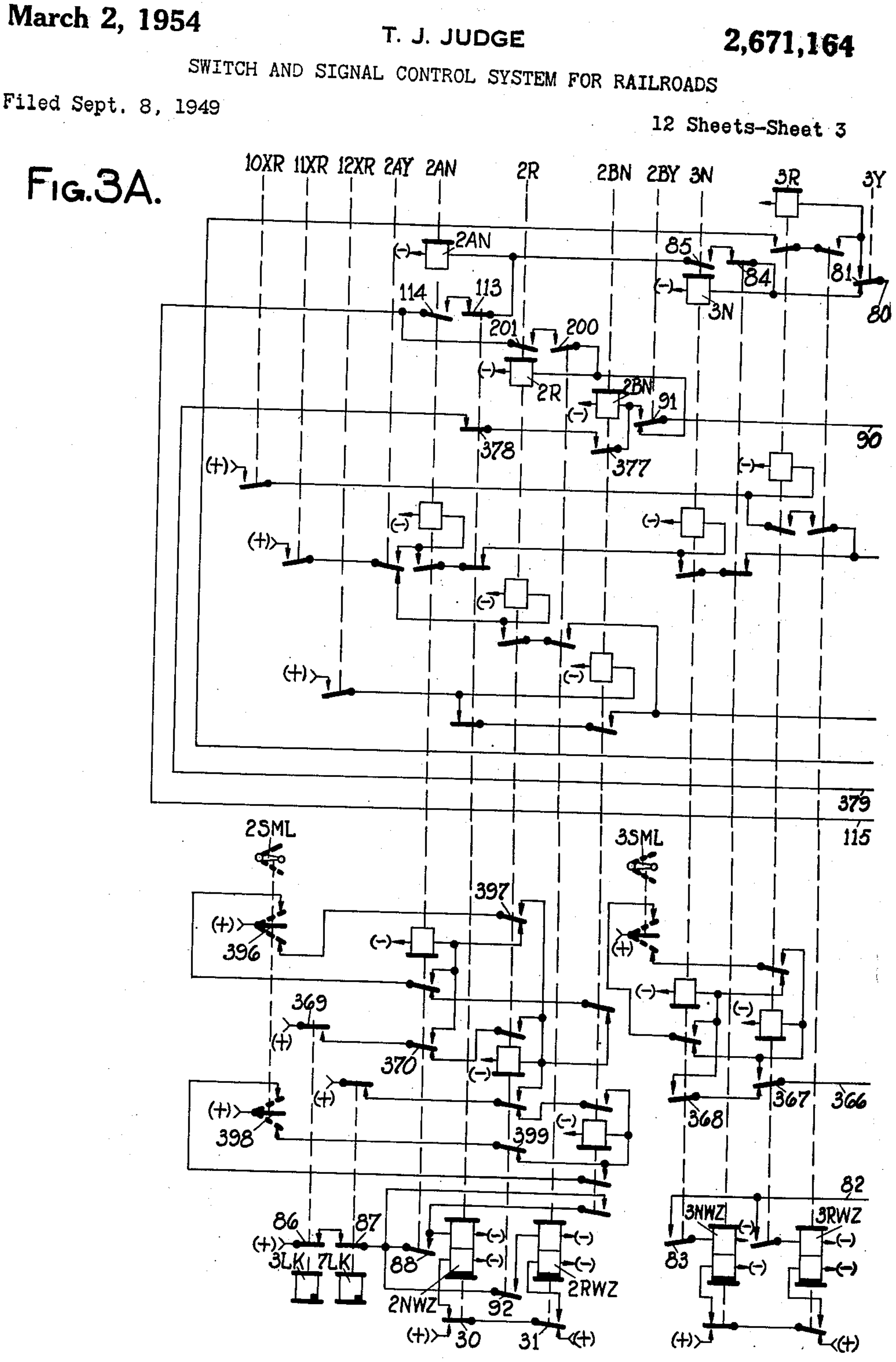
Figure 3B:
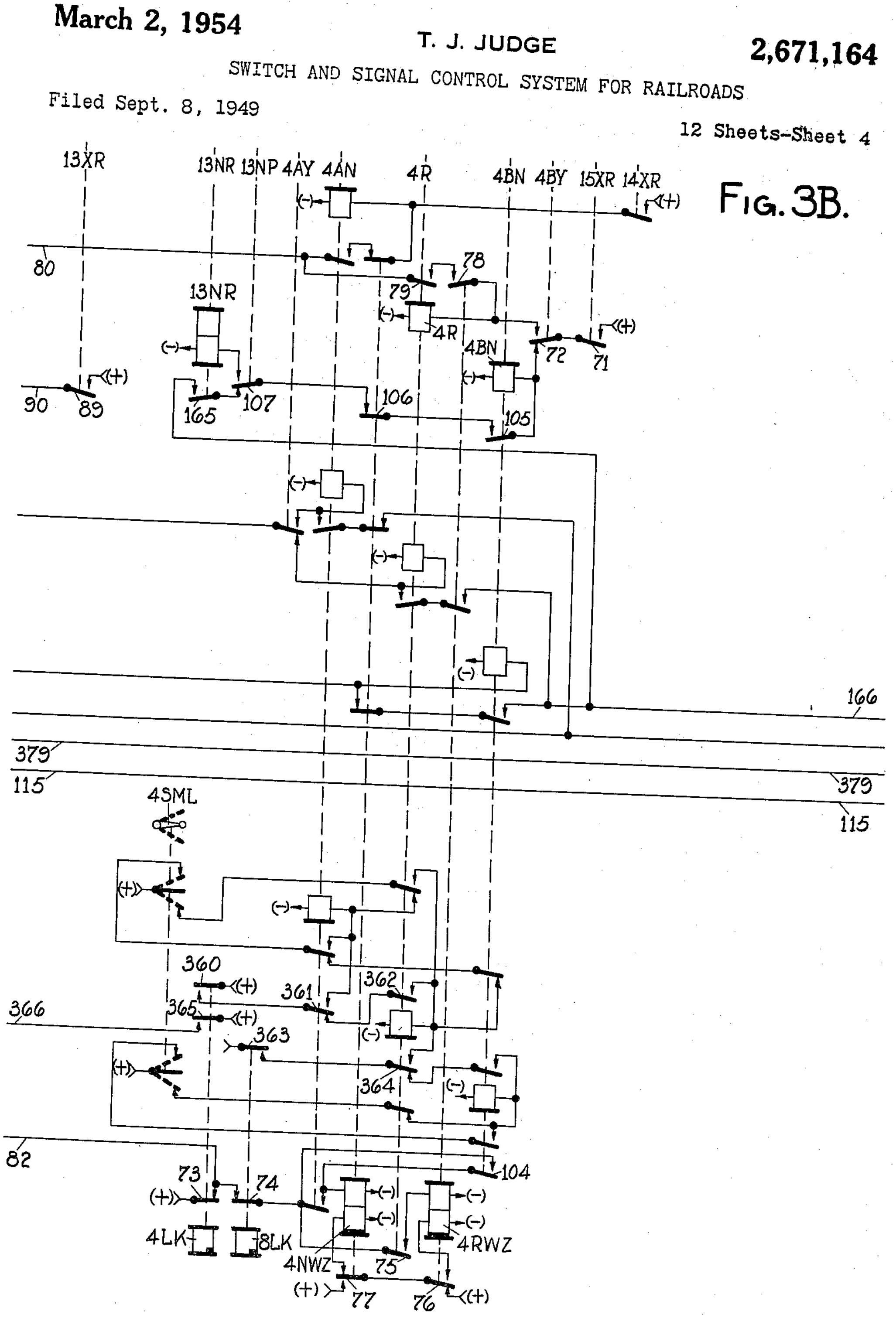

The automatic selection of the positions of the track switches for the respective routes having their ends designated comprises the use of relays Y, AY, BY (see Figs. 2A and 2B), N, AN, BN and R (see Figs. 3A and 3B). The relays Y, AY and BY are conditioned in response to entrance designation, while the other relays are selectively energized in response to exit designation, and their energization selects the positions of the respective track switches that are required to establish a route between designated entrance and exit points.

Switch control relays NWZ and RWZ are employed in providing more direct control for the respective track switches, and where the track layout is remote from the control office, as is assumed in this embodiment of the present invention, these relays are used to select switch control code characters for transmission over the code communication system to the remote track layout. The controls for the relays NWZ and RWZ differ from their associated relays N, AN, BN and R in that the relays WZ are maintained energized by stick circuits corresponding to the last position called for the associated track switch. Thus these relays are not restored to a deenergized position upon passage of a train or upon cancellation of a route, but are rather maintained picked up by their stick circuits until the opposite position of the associated single track switch or crossover is called for by the associated switch position selecting relays N, AN, BN and R.

Various magnetic stick relays are provided at the control office for receiving indications communicated from the field as to the conditions of occupancy of the respective track sections, the locked conditions of the track switches, and the conditions of the signals. There is also a magnetic stick relay WCKR provided at the control office which is conditioned over the code communication system to indicate a condition where a switch control relay in the field fails to respond to a code which has been received in the field for its control.

In addition to the provision of code receiving means in the field as disclosed in the above mentioned Hailes et al. patent, an organization of decoding relays is provided as illustrated in Fig. 6A comprising the relays CS which are selectively responsive for the respective channels of the code communication system during each control cycle of operation, and in accordance with the selective energization of these relays during a cycle, switch and signal control application relays are conditioned during an execution period at the end of the cycle. Because there are a greater number of controls to be communicated than can be scanned during a single cycle of communication, the respective controls are grouped in stations and station relays ST are provided in the field for identifying the particular group of relays for which controls are intended during any particular cycle of operation.

Switch control application relays WN and WR are provided in the field (see Fig. 6B) for the respective single track switches and crossovers, and these relays are conditioned in response to the respective switch control codes that are received. Similarly, a relay GZ is provided for each signal as an application signal control relay governed by the reception of signal control codes communicated from the control office. A relay B is provided for use in connection with the restoration of the signals to stop in accordance with restoration codes communicated from the control office.

Relays G are provided for more directly governing the energization of the signals, such relays being conditioned by the application relays GZ, and being permitted to be energized only subsequent to the complete alignment of a route extending between entrance and exit points that have been designated. The check of the complete operation of the track switches in the alignment of the routes is accomplished by normal and reverse correspondence relays NCR and RCR respectively for each crossover and each single track switch in accordance with the usual practice.

Lock relays L, route locking relays ES and WS, and track relays TR are provided as associated with the respective track sections in a manner well known to those skilled in the art, and, for simplification of the present invention, the detail controls of these relays have not been shown. The manner of control of lock relays L and route locking relays ES and WS which is typical of that which could be provided for use with the system according to the present invention is disclosed in my above mentioned prior patent.

Having thus considered the general organization of the apparatus provided for this embodiment of the present invention, it is believed that the details of the circuit organization may be more readily understood when considering typical operating conditions of the system which may be encountered in practice.

*Operation*

*Normal conditions.*—For the purpose of facilitating the description of the present invention, the conditions where the last routes established through the track layout required the track switches to be in their normal positions will be considered as the normal conditions of the system. It will also be assumed that under normal conditions there are no routes designated for establishment, the signals are all at stop, the communication system is at rest, and there are no controls or indications stored for communication by the communication system.

Under these conditions the switch control relays NWZ (see Figs. 3A and 3B) for the respective crossovers and the single track switch are energized by their stick circuits. Thus the relay 2NWZ, for example, is energized by its stick circuit extending through its front contact 30 and through back contact 31 of relay 2RWZ.

In accordance with there having been no changes in the conditions of the relays WZ at the control office subsequent to the last switch controls that have been transmitted to the field, the relays 2—3ACH and 4ACH (see Fig. 3D) are normally maintained energized by their stick circuits. The stick circuit for relay 2—3ACH extends through back contact 32 of relay 2RWZ, back contact 33 of relay 3RWZ and front contact 34 of relay 2—3ACH. The relay 4ACH which is associated with the crossover 4 is maintained picked up by its stick circuit through back contact 35 of relay 4RWZ and its front contact 36.

At the track layout in the field, the relays WN (see Fig. 6B) for the respective crossovers and the single track switch are maintained picked up by stick circuits such as the stick circuit for relay 2WN which includes front contact 37 of that relay and back contact 28 of relay 2WR.

The relays 2—3WC and 4WC (see Fig. 6A) are normally maintained picked up in accordance with the last switch control codes transmitted having been effective to correspondingly actuate the associated switch control relays. Relay 4WC is maintained picked up normally by a stick circuit including its front contact 39 and back contact 40 of relay 2ST. Relay 2—3WC is normally maintained picked up through its stick circuit including its front contact 41 and back contact 42 of the station relay 1ST. The correspondence repeater relay WCP is normally energized in accordance with the energization of the relays 2—3WC and 4WC by a circuit comprising contacts 43 and 44 of relays 2—3WC and 4WC respectively.

The correspondence relays NCR for the respective crossovers and the single track switch are normally energized. The circuit for the relay 4NCR which is associated with crossover 4 is illustrated in Fig. 8 as including suitable selections by the point detector contactor mechanisms of the switch machines associated with crossover 4 and front contact 46 of relay 4WN. This circuit is to be considered typical of the circuits that can be provided for the relays NCR that are associated with other track switches.

The red repeater relays RGP associated with the respective signals are normally energized in accordance with their associated signals being at stop. The relay 11RGP for signal 11, for example (see Fig. 10), is normally energized through contacts 49 and 50 of the signal mechanism, and the relay 12RGP of signal 12 which is associated with both units A and B of that signal is normally energized through the contacts 51 and 52 of signal unit 12A and the contacts 53 and 54 of signal unit 12B.

*Selection of switch positions.*—In response to manual designation of an entrance point by the actuation of a button NB for a route to be established, energy is applied to a circuit network, conveniently called an initiating circuit network, for the selective energization of the relays Y, AY and BY and for conditioning the exit relays XR so that they can be energized upon designation of the corresponding exit points, provided that there is an available route extending from a prior designated entrance point to the exit point designated. There is actually a separate initiating circuit network for each direction of traffic, each network having circuit branches corresponding to all possible routes emanating from any entrance point that may be designated for that direction of traffic.

Figure 4:
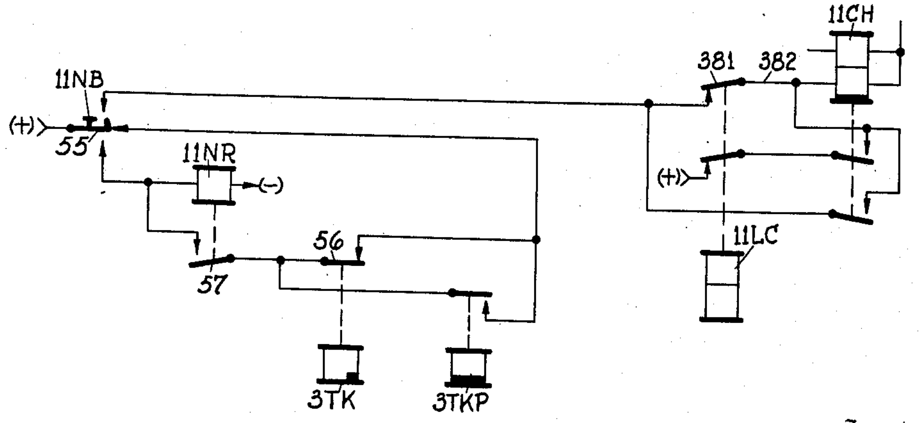
Fig. 4 illustrates a typical means for control of an entrance control relay in response to the manual actuation of an entrance control button.

If it is assumed that it is desirable to set up a route for an eastbound train having an entrance point at signal 11, the entrance button 11NB (see Fig. 1) is actuated to its depressed position, and such actuation according to Fig. 4 provides for the energization of the entrance relay 11NR. This relay is maintained picked up by its stick circuit which includes a normally closed contact 55 of the entrance button 11NB, front contact 56 of the track indication relay 3TK, and front contact 57 of relay 11NR. Thus the relay 11NR is maintained picked up until it is released in accordance with the reception of an indication that the track section 3T (see Fig. 8) has become occupied because of a train accepting the signal 11. Restoration can also be made manually by pulling out the button 11NB from its normal position and thus opening the stick circuit for relay 11NR at contact 55 of the button 11NB.

Upon the picking up of relay 11NR, energy is applied to the initiating circuit network by front contact 58 (see Fig. 2A) and energy applied by this contact is fed through the initiating circuit network that is provided for the setting up of routes for eastbound traffic so that it feeds through a branch of the network corresponding to each available route that is emanating from the signal 11. Thus, assuming that the normal conditions of the system prevail at a time when the entrance button 11NB is actuated, there are three possible routes available emanating from signal 11, one route being from signal 11 to signal 16, another route being from signal 11 to signal 13, and a third route being from signal 11 to signal 17 via crossover 4. When this route via crossover 4 is not available, and a route is available from signal 11 to signal 17 via crossover 2, the route via crossover 2 can be set up by end-to-end operation without requiring entrance and exit designation for signal 13.

The relay 4BY (see Fig. 2B) is energized in response to application of energy to the initiating network by front contact 58 (see Fig. 2A) of relay 11NR. The circuit for the energization of relay 4BY extends from (+), including front contact 58 of relay 11NR, back contact 59 of relay 11XR, back contact 60 of relay 2R, back contact 61 of relay 3R, back contact 62 of relay 3Y, wire 63, back contact 64 of relay 4AN, back contact 65 of relay 4BN, and winding of relay 4BY, to (−). The relay 3Y is not energized at this time because it is energized only by energy feeding from front contact 66 of relay 10NR, and the relay 2BY is not energized because that relay is energized in accordance with the designation of signal 12 as an entrance point for routes to be established.

If it is assumed that the route is to be set up from signal 11 to signal 17, the exit button 15XB is actuated subsequent to the actuation of the entrance button 11NB, and the actuation of this button is effective to pick up the relay 15XR by the energization of a circuit extending from (+), including front contact 58 of relay 11NR, back contact 59 of relay 11XR, back contact 60 of relay 2R, back contact 61 of relay 3R, back contact 62 of relay 3Y, wire 63, back contact 64 of relay 4AN, back contact 65 of relay 4BN, front contact 67 of relay 4BY, winding of relay 15XR, back contact 68 of relay 15NR, back contact 69 of relay 15GK, and button 15XPB in its depressed position, to (−). This relay when picked up establishes a stick circuit at front contact 70 to maintain the relay picked up subsequent to the restoration of the button 15XPB to its normal position.

Similarly, if the exit point for either of the other two routes emanating from signal 11 were to be designated, the corresponding exit relay XR would be picked up and maintained picked up by a stick circuit so that its energization would be dependent upon energy feeding through the circuit network from the front contact 58 of the entrance relay 11NR.

In response to the picking up of the exit relay 15XR for a route extending from signal 11 to signal 17 under the conditions above considered, a pick-up circuit is closed in the completion circuit network (see Figs. 3A and 3B) for the relay 4R as selected by the energized condition of the relay 4BY. The circuit for the energization of relay 4R extends from (+), including front contact 71 of relay 15XR, front contact 72 of relay 4BY, and winding of relay 4R, to (−).

Relay 4R when picked up closes a pick-up circuit for the switch control relay 4RWZ which is also associated with the control of the track switches of the crossover 4. This circuit extends from (+), including front contact 73 of relay 4LK, front contact 74 of relay 8LK, front contact 75 of relay 4R, and upper winding of relay 4RWZ, to (−). It will be noted that the energization of the relay 4RWZ by this circuit checks that the lock indication relays 4LK and 8LK, which are provided for the detector track sections at the respective ends of the crossover 4 are in their picked up positions corresponding to the energization of corresponding lock relays at the track layout. It will thus be seen that if the crossover 4 were locked by the deenergization of a lock relay for either of the detector track sections 4T or 8T (see Fig. 8) in the field, the relay 4RWZ could not be picked up. The picking up of relay 4RWZ causes the release of relay 4NWZ by the opening of its stick circuit at back contact 76, and the relay 4NWZ when dropped away establishes a stick circuit at back contact 77 by which the relay 4RWZ is maintained energized, irrespective of the condition of relay 4R and irrespective of the condition of the lock indication relays 4LK and 8LK.

Upon the picking up of relay 4RWZ, the closure of its front contact 78 in the completion circuit network provides that energy can feed through the network to energize the switch position selecting relay for the next track switch toward the entrance point, which is the relay 3N. This relay is selected rather than the relay 3R because of the relay 3Y being deenergized at this time. The circuit for the energization of relay 3N extends from (+), including front contact 71 of relay 15XR, front contact 72 of relay 4BY, front contact 78 of relay 4RWZ, front contact 79 of relay 4R, wire 80, back contact 81 of relay 3Y, and winding of relay 3N, to (−).

Because of it having been assumed that the relays NWZ are in their picked up positions under normal conditions, the relay 3NWZ is already picked up at this time, but the picking up of relay 3N closes a pick-up circuit for this relay so that it could be picked up if it were in its dropped away position at a time when the normal position of the track switch 3 were called for. This pick-up circuit extends from (+), including front contact 73 of the lock indication relay 4LK, wire 82, front contact 83 of relay 3N, and upper winding of relay 3NWZ, to (−).

With relay 3NWZ picked up, and relay 3N picked up, a circuit is closed through the completion circuit network for the picking up of the relay 2AN to select the normal positions of the track switches of the crossover 2. This circuit extends from (+), including front contact 71 of relay 15XR, front contact 72 of relay 4BY, front contact 78 of relay 4RWZ, front contact 79 of relay 4R, wire 80, back contact 81 of relay 3Y, front contact 84 of relay 3NWZ, front contact 85 of relay 3N, and winding of relay 2AN, to (−).

The relay 2AN in picking up establishes a pickup circuit for the relay 2NWZ, although the relay 2NWZ is already in its picked up position at this time under the assumed conditions of operation. The pick-up circuit for the relay 2NWZ extends from (+), including front contact 86 of the lock indication relay 3LK, front contact 87 of relay 7LK, front contact 88 of relay 2AN, and upper winding of relay 2NWZ, to (−).

If on the other hand an operator were to actuate the exit button 13XB subsequent to the designation of an entrance point at signal 11, rather than the button 15XB, a route would be automatically selected over the crossover 2 to signal 13. This is because the relay 2BY is deenergized at that time, and with that relay in its deenergized position, the energization of the relay 2R in the completion circuit network is selected. The relay 2R is energized under these conditions by a circuit extending from (+), including front contact 89 (see Fig. 3B) of relay 13XR, wire 90, back contact 91 of relay 2BY, and winding of relay 2R, to (−). Relay 2R upon picking up under these conditions would provide for the energization of relay 2RWZ by the closure of a circuit including front contacts 86, 87, and 92 of relays 3LK, 7LK and 2R respectively.

The general nature of the route selection means is such that if the route extending from signal 11 to signal 17 is not available at the time of its entrance-exit designation via crossover 4, it can be automatically selected via crossover 2 by end-to-end entrance-exit designation without requiring entrance and exit designation for signal 13.

To consider the specific circuits involved in this mode of operation, it will be assumed that the crossover 4 is locked in its normal position as by a route extending from signal 10 to signal 16 so as to select that a route will be established from signal 11 to signal 17 via crossover 2 in response to the actuation respectively of the buttons 11NB and 15XB. Because of the relay 4AN being picked up at this time, the circuit that has been described for the energization of the relay 4BY is open at back contact 64 (see Fig. 2B) and thus the relay 4BY remains deenergized subsequent to the actuation of the entrance button 11NB. This opens the circuit feed for the relay 15XR through the portion of the initiating circuit network comparable to the crossover 4.

The through route control entrance repeater relay 13NP is energized through the initiating circuit network in a circuit extending from (+), including front contact 58 (see Fig. 2A) of relay 11NR, back contact 59 of relay 11XR, back contact 93 of relay 2AN, back contact 94 of relay 2BN, back contact 95 of relay 2BY, wire 96, back contact 97 of relay 13XR, back contact 98 of relay 13GK, front contact 99 of relay 8LK, back contact 100 of relay 13NR, and winding of relay 13NP, to (−). Relay 13NP when picked up establishes a stick circuit through its front contact 101 to shunt the back contact 100 of relay 13NR out of the circuit just described. Relay 13NP when picked up conditions a circuit so that the exit relay 15XR can be energized when the exit button 15XPB is actuated. The circuit energized for relay 15XR under these conditions extends from (+), including front contact 102 of relay 13NP, back contact 103 of relay 4R, back contact 67 of relay 4BY, winding of relay 15XR, back contact 68 of relay 15NR, back contact 69 of relay 15GK, and button 15XPB, to (−). The picking up of relay 15XR under these conditions establishes a stick circuit at front contact 70 to maintain that relay picked up subsequent to the restoration of the exit button 15XPB from its depressed position.

Upon the picking up of relay 15XR under these conditions, a circuit is closed for the relay 4BN including front contact 71 (see Fig. 3B) of relay 15XR, and back contact 72 of relay 4BY. When relay 4BN is picked up by the energization of this circuit, the normal switch control relay 4NWZ is energized by a circuit including front contacts 73, 74, and 104 of relays 4LK, 8LK and 4BN respectively.

When the relay 4NWZ has become picked up, the entrance relay 13NR for the entrance point at signal 13 has its lower winding energized in the completion circuit network by a circuit extending from (+), including front contact 71 of relay 15XR, back contact 72 of relay 4BY, front contact 105 of relay 4BN, front contact 106 of relay 4NWZ, front contact 107 of relay 13NP, and lower winding of relay 13NR, to (−).

Upon the picking up of relay 13NR, the relay 13XR becomes picked up by its energization in the initiating circuit network through a circuit including front contact 58 (see Fig. 2A) of relay 11NR, back contact 59 of relay 11XR, back contacts 93, 94 and 95 of relays 2AN, 2BN and 2BY respectively, wire 96, winding of relay 13XR, and front contacts 108 and 109 of relays 13NR and 13NP respectivly. This relay when picked up closes a stick circuit at front contact 110 to provide that the relay is maintained energized dependent upon energy feeding from the front contact 58 of relay 11NR, even though the relay 13NP is dropped away by the opening of its circuit at back contact 97 of relay 13XR. It will be noted that the relay 13NR is maintained picked up, however, by the energization of a stick circuit for its upper winding which can be comparable to the stick circuit that has been described for the relay 11NR (see Fig. 4).

The picking up of relay 13XR under these conditions energizes the relay 2R for selecting the reverse positions of the track switches of crossover 2 in a manner which has been described, and the picking up of that relay provides for the energization of the switch control relay 2RWZ.

Having thus considered specifically the selection of typical routes through the track layout and the conditioning of the switch control relays NWZ and RWZ in accordance therewith, it is believed that it should be readily understood that a similar mode of operation is effective in the establishment of other routes which may be desired to be established either in the present track layout or in other track layouts to be encountered in practice. It will be noted from the typical conditions that have been considered that the switch position selecting relays AN, BN, N and R for the respective crossovers and single track switches are energized in cascade, starting with the relays associated with the track switch of crossover adjoining the exit end of the route, the cascade energization of these relays being effective progressively only so long as the associated relays NWZ and RWZ are positioned in correspondence with the respective normal and reverse positions of the track switches that are selected.

*Transmission of control codes.*—As reference can be made to the above mentioned Hailes et al. patent for details relative to the operation of the code communication system, it is sufficient for an understanding of the present invention to assume that the code communication apparatus has a general mode of operation for the communication of controls wherein controls are transmitted during respective control cycles of operation which are initiated from a period of rest of the system.

The first three code characters transmitted according to the present embodiment are conveniently called station selection code characters, and although they do not select respective spaced stations along the railway as is done in centralized traffic control systems, they select the energization of respective station relays ST at the track layout, and the selective energization of these relays ST identifies the particular function or functions that are to be controlled during that control cycle.

It is therefore provided, according to the code chart of Fig. 12, that distinctive station selection codes are assigned respectively for the control of signals 10 and 14, signal 11, signal 12, signals 13 and 15, switches 2 and 3, and switch 4.

The last two characters transmitted during a control cycle define the specific control that is to be applied to the particular device that is identified by the first three characters transmitted during that cycle. Thus, for example, if the cycle is for the control of a particular one of two opposing signals, the transmission of an (LS) character as the fourth character of the cycle and an (SL) character as the fifth character of a cycle establishes that the signal is to be cleared for governing traffic to the right (eastbound traffic). It is therefore provided, for example, that if the station selection code is for signals 10 and 14 which are opposing signals, the transmission of the characters (LS) and (SL) as the respective fourth and fifth characters of the control cycle selects that the signal 10 is to be cleared for governing eastbound traffic. If the same station is called and the fourth and fifth characters are respectively (SL) and (LS), it is selected that signal 14 is to be cleared for governing traffic to the left (westbound traffic). If a signal is to be put to stop, the fourth and fifth characters are both (SL) characters, and if the signal control communicated is for a call-on signal, both the fourth and fifth characters are (LS) characters.

If a switch station is identified by the station portion of a control cycle, the remaining characters are used for identifying the position to which respective track switches are to be operated, an (LS) character being used for the operation of the track switch to its normal position, and an (SL) character being used for operating a track switch to its reversed position. Inasmuch as it requires only one channel for the communication of a switch control, as many switches can be controlled by a single cycle of operation as there are number of channels provided in the communication system above that which is required for station selection. For this embodiment of the present invention two channels have been provided in addition to the station selection channels, but additional steps may be employed in the communication system for expansion of both station selection and control codes in accordance with the requirements of practice.

According to the general mode of operation of the communication system disclosed in the Hailes et al. patent, a start relay CH is picked up at the control office for initiating transmission to a designated field station, and this relay when picking up causes the picking up of an associated relay LC which has a number of contacts associated therewith which connect code determining and switch jumper contacts to the respective channel wires of the code communication system for selecting the characters to be transmitted during a control cycle that has been thus initiated. These relays LC are energized in a chain circuit network so that it is determined that control cycles are transmitted for respective stations in a predetermined order under conditions where controls for more than one station are designated for transmission contemporaneously.

Similarly in this embodiment of the present invention, start relays CH are provided for the respective stations, and these relays are picked up for their stations in accordance with the selection of a route by the entrance-exit selecting network. This is true for the communication of the switch controls as well as for the communication of the signal controls. In either case, in the establishment of routes, it is required that a route selection be completed before there is any initiation of the system into a cycle of operation for the communication of one or more switch controls to the remote track layout.

In accordance with principles of operation set forth in the above mentioned Hailes et al. patent, a relay LCS is picked up upon initiation of a cycle of operation for transmission to any one of the stations, and the picking up of this relay prevents the picking up of any other relays LC until that cycle of operation has been completed.

To consider a specific example of the selection and transmission of switch and signal control codes in response to entrance-exit designation, it will be assumed that a route has been designated extending from signal 11 to signal 17, and that the route has been selected via crossover 4 so as to cause the relays 2NWZ, 3NWZ and 4RWZ to be picked up in a manner which has been described.

In accordance with the picking up of the relay 4RWZ, which is effective prior to the dropping away of the relay 4NWZ, the stick circuit for the normally energized change relay 4ACH (see Fig. 3D) is momentarily open because of contacts 111 and 35 of relays 4NWZ and 4RWZ being both open at the same time momentarily so that the relay 4ACH becomes dropped away. The dropping away of this relay, by the closure of its back contact 112 conditions a circuit for the lower winding of relay 4CH so that such relay can be picked up to initiate the transmission of a control cycle for the control of the track switches of crossover 4 upon the route selection being completed and the actuation of the switch control relays NWZ and RWZ being checked for the respective track switches of the route.

Because of there being no change called for in the positions of the track switches of crossover 2 and the single track switch 3 from the positions assumed under normal conditions of the system, the automatic start relay 2—3ACH for the station associated with the control of these track switches remains energized, and thus there is no control cycle transmitted under the specific condition of route establishment which is being considered for the control of these track switches. It will thus be seen that automatic start relays ACH are dropped away only for the respective stations wherein a change in the position of one or more of the track switches is called for by the route being selected. The actual initiation of the transmission of controls for these stations having their relays ACH dropped away is not rendered effective until complete selection has been accomplished for all track switches in the route designated, and until it is checked that the relays NWZ and RWZ have responded in correspondence with the associated switch positions that have been selected.

Subsequent to these relays having been conditioned for the route under consideration, a pick up circuit is closed for the relay 11CH (see Fig. 3C) extending from (+), including front contact 71 (see Fig. 3B) of relay 15XR, front contact 72 of relay 4BY, front contact 78 of relay 4RWZ, front contact 79 of relay 4R, wire 80, back contact 81 of relay 3Y, front contact 84 of relay 3NWZ, front contact 85 of relay 3N, front contact 113 of relay 2NWZ, front contact 114 of relay 2AN, wire 115, back contact 116 of relay 11RC, upper winding of relay 11CH, wire 117, and normally closed contact 118 of the cancel button CNPB, to (—).

Upon the picking up of relay 11CH, energy is applied to a pick up bus 119 through front contact 120 of relay 11CH to provide energy for the picking up of all switch control station start relays CH that have had their circuits conditioned for energization by the dropping away of the associated normally energized relay ACH. Thus, under the specific assumed conditions, the relay 4ACH is dropped away at this time so that relay 4CH is picked up by energy applied to this pick up bus 119 through back contact 112 of relay 4ACH.

Relay 4CH when picked up closes a pick up circuit for the relay 4LC, such circuit including back contacts 121, 122, and 123 of relays SB, CF and LCS, respectively, front contact 124 of relay 4CH, lower winding of relay 4LC cancel bus 117 and normally closed contact 118 of the cancel button CNPB. When relay 4LC is picked up under these conditions, it is maintained picked up until the end of the control cycle that is being initiated by a stick circuit which is energized through back contacts 125, 126, and 127 of relays SB, C and LV respectively connected in multiple, winding of relay LCS, front contact 128 of relay 4LC and normal closed contact 118 of the button CNPB. Relay LCS is thus picked up by the energization of this stick circuit so that it is maintained picked up throughout the cycle, and the picking up of this relay opens the pick up circuit for the relays LC at back contact 123 to prevent the picking up of other relays LC during a cycle of operation.

When pick up energy is applied to the relay 4LC, prior to the picking up of relay LCS, a pick up circuit is closed for the lower winding of relay 4ACH including back contacts 121, 122, and 123 of relays SB, CF and LCS respectively, front contact 124 of relay 4CH, and front contact 129 of relay 4CH. This circuit is only momentarily closed because the relay LCS becomes energized directly in the stick circuit for relay 4LC that has been described. The picking up of relay LCS opens the pick up circuit for relay 4ACH at back contact 123. The relay 4CH is maintained energized by its stick circuit including back contact 130 of relay 4LC and front contact 131 of relay 4CH until the relay 4LC is picked up to open this circuit at back contact 130, and thus the relays 4ACH and 4CH are restored to their respective normally energized and deenergized positions upon energization of the associated relay 4LC for initiation of a control cycle for transmission of controls for the track switches of crossover 4. The initiation of the cycle upon the picking up of relay LCS is accomplished in a manner fully disclosed in the above mentioned Hailes et al. patent, and this relay LCS is maintained picked up until the end of the cycle because of the back contact 127 of relay LV (last step relay) being maintained closed until the transmission of the control pulses has been completed.

The energization of relay 4LC during the control cycle of operation of the communication system connects the respective channel wires Nos. 1, 2, 3, 4 and 5 through contacts and jumpers selecting the respective characters to be transmitted through these respective channels. It is thus provided that the channel wires 1, 2, and 3 are connected through front contacts 132, 133, and 134 respectively of relay 4LC, through the code determining jumpers 135, 136, and 137 so as to provide that the first three characters transmitted during the cycle are respectively (SL), (LS) and (SL). The fourth character of the control code under consideration is a spare channel and is not used for control purposes, and thus the relay LS is picked for this channel through front contact 138 of relay 4LC. The fifth character transmitted during control cycle determines the position to which the track switches of crossover 4 are to be actuated as determined by the relays 4NWZ and 4RWZ, and under the assumed conditions where the relay 4RWZ is picked up and the relay 4NWZ is deenergized, the character transmitted is a (SL) character as selected by front contact 139 of relay 4RWZ. In accordance with the mode of operation of the code communication system as set forth in the above mentioned Hailes et al. patent, the selective energization of the relays LS and SL through code selecting circuits as has been described provides in accordance with the closure of their front contacts 140 and 141 respectively for the selective transmission of the respective code characters (LS) and (SL) that have been selected for transmission.

When the transmission of the switch control cycle has been completed, the relay LV is picked up, and the picking up of that relay prior to the dropping away of the relays SB and C opens the stick circuit for the relay 4LC, and also deenergizes the relay LCS, by the opening of back contact 127. Thus the relays 4LC and LCS are restored to their normally deenergized positions during a clear out period at the end of the cycle of operation, and the dropping away of the relay SB at the end of the clearing out period conditions a circuit whereby another relay LC can be picked up if there is another station start that has been initiated.

Under the conditions which have been assumed, there has been no start initiated for the transmission of a switch control for crossover 2 or for the single track switch 3, and thus the relay 2—3ACH is maintained steadily energized at this time and closes front contact 142 in the chain circuit organization for the energization of the relays LC. If this relay were dropped away, however, it would be provided that the relay 2—3LC would have to be picked up for the transmission of a switch control cycle prior to the transmission of a cycle for governing the clearing of a signal. In other words, by the inclusion of a front contact of a relay ACH for each switch station in the circuit network for the energization of the relays LC, it is provided that all switch controls must be transmitted prior to the transmission of a signal control, particularly because of the switch station relays LC having priority in the LC chain circuit.

After the relay 11CH (see Fig. 3C) has been picked up as has been described by energy feeding through the completion circuit network, the closure of its front contact 143 provides for the energization of the upper winding of relay 11RC from the same source of energy, and the picking up of relay 11RC opens the pick up circuit for the relay 11CH at back contact 146. The relay 11CH is maintained picked up until transmission of a signal control cycle for signal 11 by a stick circuit which includes back contact 144 of relay 11LC and front contact 145 of relay 11CH. Energy is applied through these contacts to wire 146 which is connected through the lower winding of relay 11CH and through the cancel bus 117 and normally closed contact 118 of the cancelled button CNPB.

The initiation of a control cycle for transmission to the station assigned for signal 11 is rendered effective subsequent to the transmission of the switch controls required for the route being established. Thus when the normally energized change relays ACH are all restored to their energized positions, a circuit is closed whereby the relay 11LC is energized for initiation of a control cycle for communication of a control to clear signal 11. The circuit for the relay 11LC under these conditions extends from (+), including back contact 121 (see Fig. 3D) of relay SB, back contact 122 of relay CF, back contact 123 of relay LCS, back contact 124 of relay 4CH, front contact 147 of relay 4ACH, back contact 148 of relay 2—3CH, front contact 142 of relay 2—3ACH, back contact 149 of relay 13—15CH, wire 150, back contact 151 of relay 12CH, front contact 152 of relay 11CH, lower winding of relay 11LC, cancel bus 117, and normally closed contact 118 of the cancel button CNPB, to (—). The picking up of relay 11LC establishes a stick circuit including the upper winding of that relay and the winding of relay LCS in a manner comparable to that which has been specifically described relative to the stick circuit energization of the relay 4LC.

A control cycle is thus initiated for transmission of a control to clear signal 11, and the respective channel wires Nos. 1, 2, 3, 4 and 5 are respectively connected through front contacts 153, 154, 155, 156, and 157 of relay 11LC. The first three characters transmitted during the control cycle are determined by the jumpers 158, 159, and 160 which are associated with the channels 1, 2, and 3 respectively so that the first three characters transmitted are respectively (LS), (LS) and (SL).

The fourth and fifth characters in combination designate the clearing of a signal. Thus for governing eastbound traffic the fourth character is selected as a (LS) character by the energization of relay LS through front contact 156 of relay 11LC, front contact 161 of relay 11RC and front contact 162 of the entrance relay 11NR. The last character of the control cycle is a (SL) character because of the energization of relay SL through front contact 157 of relay 11LC, front contact 163 of relay 11RC and front contact 164 of relay 11NR.

The relay 11LC in picking up at the beginning of the cycle opens the stick circuit for the relay 11CH at back contact 144 to cause that relay to be dropped away, and upon completion of the cycle, the relay 11LC is dropped away to complete the restoration of the communication apparatus to its normal condition subsequent to the transmission of switch and signal controls for the setting up of the route from signal 11 to signal 17 via crossover 4.

If on the other hand it is assumed that the route cannot be established from signal 11 to signal 17 via crossover 4 because, for example, of a route being established from signal 10 to signal 16 requiring the track switches of the crossover 4 to be in their normal positions, the route via crossover 2 is selected by end to end operation without requiring the actuation of entrance and exit buttons for signal 13 in a manner which has been described. This route calls for the track switches of crossover 4 to be normal and of crossover 2 to be reversed. Inasmuch as it is assumed that the track switches of crossover 4 are in their normal positions under these conditions there is no interruption of the stick circuit for the relay 4ACH to initiate transmission of a control cycle for the crossover 4, but a change is required for the positions of the track switches of crossover 2, and thus by the picking up of relay 2RWZ, the opening of back contact 32 in the stick circuit for relay 2—3ACH interrupts the stick circuit energization of relay 2—3ACH, and that relay becomes dropped away to condition the relay 2—3CH so that it can be picked up subsequent to the checking through the completion circuit network that the switch control relays have been properly positioned in correspondence with the switch position relays that have selected the switch positions for the route.

As has been pointed out in considering the selection of the positions of the track switches for the route under consideration, the relay 13XR (see Fig. 2B) is picked up in response to the picking up of the entrance relay 13NR in the completion circuit network, and the picking up of the relay 13XR opens the circuit for the through-route relay 13NP at back contact 97 (see Fig. 2B) to cause that relay to be dropped away. The dropping away of relay 13NP under these conditions establishes a circuit through the completion circuit network for the picking up of the relay 13—15CH (see Fig. 3D). Such circuit extends from (+) including front contact 71 of relay 15XR (see Fig. 3B), back contact 72 of relay 4BY, front contact 105 of relay 4BN, front contact 106 of relay 4NWZ, back contact 107 of relay 13NP, front contact 165 of relay 13NR, wire 166, back contact 167 of relay 13—15RC, upper winding of relay 13—15CH, cancel bus 117, and normally closed contact 118 of the cancel button CNPB, to (—).

The picking up of relay 13—15CH under these conditions applies energy at front contact 168 to the pick up bus 119 for the switch cycle start relays 2—3CH and 4CH so that the relay 2—3CH is picked up by the energization of its lower winding through back contact 169 of relay 2—3ACH and front contact 168 of relay 13—15CH. The mode of operation in the transmission of the switch control cycle thus initiated is comparable to that which has been described specifically for the transmission of a switch control cycle in accordance with the picking up of relay 4CH. The relay 2—3LC when picked up for this cycle connects the channel wires 1, 2, 3, 4 and 5 respectively through the front contacts 170, 171, 172, 173, and 174 of that relay and through code selection jumpers 175, 176, and 177 and contacts of the switch control relays 2NWZ, 2RWZ, 3NWZ, and 3RWZ to energize the relays LS and SL for the respective steps of the code communication system to transmit code characters during the switch control cycle thus initiated corresponding to the characters required according to the code chart of Fig. 12 for transmitting a reverse control for the track switch 3 and a reverse control for the track switches of crossover 2. The station code transmitted during this cycle comprises the characters (SL), (LS) and (LS) as selected by the code determining jumpers 175, 176, and 177. The fourth character of the cycle is a (SL) character in accordance with the closure of front contact 178 of the reverse switch control relay 3RWZ. The fifth character of the switch control cycle under consideration is a (SL) character because of the closure of front contact 179 of relay 2RWZ.

During the process of transmission of the switch control cycle that is assumed to be transmitted, the relay 2—3ACH is restored to its normally energized condition and the relay 2—3CH is dropped away in a manner comparable to that which has been described for the respective relays 4ACH and 4CH which are associated with the transmission of controls for the crossover 4.

At the end of the cycle the relay 2—3LC is dropped away, and a circuit is closed for the picking up of relay 13—15LC to initiate the transmission of a signal control cycle to permit the clearing of signal 13. This circuit by which relay 13—15LC is energized extends from (+), including back contact 121 of relay SB, back contact 122 of relay CF, back contact 123 of relay LCS, back contact 124 of relay 4CH, front contact 147 of relay 4ACH, back contact 148 of relay 2—3CH, front contact 142 of relay 2—3ACH, front contact 149 of relay 13—15CH, lower winding of relay 13—15LC, cancel bus 117, and normally closed contact 118 of the cancel button CNPB, to (—). This relay 13—15LC when picked up connects the channel wires 1, 2, 3, 4 and 5 through the front contacts 180, 181, 182, 183, and 184 respectively and through jumper and entrance relay contact selections to determine the code characters to be transmitted during the cycle of operation that has been initiated. The picking up of relay 13—15LC opens the stick circuit for relay 13—15CH at back contact 185 to cause that relay to be dropped away. The pick up circuit for relay 13—15CH has been opened by the picking up of the relay 13—15RC which is picked up through front contact 186 of relay 13—15CH by energy feeding through the completion circuit network. The relay 13—15RC is maintained picked up dependent upon restoration of the signal 13 to stop by the energization of a stick circuit extending from (+), including front contact 187 of relay 13NR, front contact 188 of relay 13—15RC, front contact 189 of relay 8TK and lower winding of relay 13—15RC, to (—). Back contact 190 of relay 8TKP is included in multiple in the circuit just described with front contact 189 of relay TK for purposes of permitting the re-establishment of the stick circuit for relay 13—15RC while a train is occupying the track section 8T.

The station code transmitted during the cycle of operation of the communication system under consideration comprises the respective characters (LS), (SL) and (SL) as selected by the jumpers 191, 192 and 193, and the fourth and fifth characters are respectively (LS) and (SL) characters as selected by relay 13—15RC and 13NR. The fourth character of the code is a (LS) character because the relay LS is energized through front contact 194 of relay 13—15RC, back contact 195 of relay 15NR and front contact 196 of relay 13NR. The fifth character is a (SL) character because of the energization of relay SL through front contact 197 of relay 13—15RC, back contact 198 of relay 15NR and front contact 199 of relay 13NR.

After the signal control cycle for the control of signal 13 has been transmitted, a subsequent cycle of operation is initiated for the transmission of a cycle for the signal 11. This cycle of operation is initiated because the relay 11CH is picked up upon the completion of the selection of the positions of the track switches and the response of the relay 2RWZ in correspondence with the reverse switch positions selected for the crossover 2. The circuit for the energization of relay 11CH under these conditions extends from (+), including front contact 89 of relay 13XR (see Fig. 3B) wire 90, back contact 91 of relay 2BY, front contact 200 of relay 2RWZ, front contact 201 of relay 2R, wire 115, back contact 116 of relay 11RC, upper winding of relay 11CH, cancel bus 117, and contact 118 of the cancel button CNPB, to (—). The picking up of this relay establishes a pick up circuit for the relay 11RC upon the closure of its front contact 143, and the relay 11RC when picked up is maintained picked up through its stick circuit including front contact 202 of relay 11NR, front contact 203 of relay 11RC, front contact 204 of relay 3TK and lower winding of relay 11RC. The picking up of relay 11CH applies energy through front contact 120 to the pick up bus 119 for the switch control start relays 2—3CH and 4CH, but the transmission of the switch controls has already been initiated. In turn the relay 11LC is picked up to start the transmission of a cycle of operation for the control of signal 11. The circuit for energizing relay 11LC extends from (+), including back contact 121 (see Fig. 3D) of relay SB, back contact 122 of relay CF, back contact 123 of relay LCS, back contact 124 of relay 4CH, front contact 147 of relay 4ACH, back contact 148 of relay 2—3CH, front contact 142 of relay 2—3ACH, back contact 149 of relay 13—15CH, wire 150, back contact 151 of relay 12CH, front contact 152 of relay 11CH, lower winding of relay 11LC, cancel bus 117, and normally closed contact 118 of the cancel button CNPB, to (—). The selection of characters for transmission during this cycle for the clearing of signal 11 is accomplished in a manner which has been heretofore described when considering the setting up of a route from signal 11 to signal 17 via crossover 4.

It is believed that it should be readily apparent from the typical conditions that have been specifically described with respect to the transmission of switch and signal control codes that codes are selected according to the principles of operation that have been considered in the establishment of other routes through the track layout and in the establishment of routes through other track layouts for which a similar system may be provided in practice.

*Reception of control codes.*—The reception of control codes at the track layout is accomplished by stepping means such as is fully described in the above mentioned Hailes et al. patent, and in accordance with the reception of selected long "on" or "off" periods for the respective channels for communication of station codes and control codes, decoding relays CS (see Fig. 6A) are picked up. Thus relays 1CS and 2CS, are provided for the first character of the station code, the relay 1CS being picked up if it is a (LS) character that is received, and the relay 2CS being picked up if it is a (SL) character that is received. Similarly the relays 3CS and 4CS are associated with the reception of the second code character, 5CS and 6CS with the third code character, 7CS and 8CS with the fourth code character and 9SL and 10CS with the fifth code character.

If it is assumed that the controls for the establishment of the route extending from signal 11 to signal 17 via crossover 4 are transmitted, the controls for operation of the track switches of crossover 4 to their reversed positions are first transmitted during a control cycle as has been described, and when this control cycle is received at the track layout, the relays 2CS, 3CS, 6CS, 7CS and 10CS (see Fig. 6A) are picked up corresponding to the code (SL), (LS), (SL), (LS), (SL) which is transmitted for operating the track switches of crossover 4 to their reverse positions.

The first three characters of the code provide for the energization of the station relay 2ST which is associated with the control of the track switches of the crossover 4. This relay is energized during the reception of the cycle by a circuit extending from (+), including front contact 205 of relay 2CS, front contact 206 of relay 3CS, front contact 207 of relay 6CS and winding of relay 2ST, to (−). The picking up of relay 2ST opens back contact 40 in the stick circuit for the relay 4WC to cause the relay 4WC to be dropped away. Relay 4WC in dropping away opens the pick up circuit for the relay WCP at front contact 43, but relay WCP is maintained picked up at this time by its stick circuit which includes front contact 208 of relay 2ST and front contact 209 of relay WCP. The dropping away of relay 4WC, with the station relay 2ST picked up, closes a pick up circuit for the station repeater relay 2STP extending from (+), including back contact 210 of relay 4WC, front contact 211 of relay 2ST, and winding of relay 2STP, to (−). The picking up of this relay establishes a stick circuit upon the closure of its front contact 212 to shunt the back contact 210 of relay 4WC out of the circuit just described.

Upon the picking up of the station repeater relay 2STP, a pick up circuit is conditioned so that upon completion of the cycle to the point of execution of the control codes received during the cycle, the reverse switch control relay 4WR is picked up. The energization of relay 4WR under these conditions is obtained through back contact 213 of relay SA, front contact 214 of relay LV, back contact 215 of relay 1CS, back contact 216 of relay 4CS, back contact 217 of relay 5CS, back contact 218 of relay 8CS, back contact 219 of relay 9CS, front contact 220 of relay 10CS, front contact 221 of relay 2STP, wire 222, upper winding of relay 4WR, back contact 223 of relay 10GZ, back contact 224 of relay 13GZ, front contact 225 of relay 8L, back contact 226 of relay 15GZ, back contact 227 of relay 14GZ, back contact 228 of relay 11GZ, and front contact 229 of relay 4L. This relay when picked up opens the stick circuit for relay 4WN at back contact 38, and it is maintained picked up by a stick circuit established for its lower winding including back contact 230 of relay 4WN, front contact 231 of relay 4WR and lower winding of relay 4WR.

In order that the correspondence checking relay WCP may be maintained continuously energized, it is required that the relay 4WC be restored to its picked up position before the relay 2STP has had time to be dropped away at the end of the control cycle under consideration to remove stick circuit energy from relay WCP. The relay 2STP has been made slightly slow acting to insure pick up time for the relay 4WC subsequent to the switch control relays 4WN and 4WR having been conditioned in accordance with the switch control code that has been received for the control of these relays. It is thus provided that the relay 4WR when picked up closes a pick up circuit for relay 4WC extending from (+), including back contact 213 of relay SA, front contact 214 of relay LV, back contact 215 of relay 1CS, back contact 216 of relay 4CS, back contact 217 of relay 5CS, back contact 218 of relay 8CS, back contact 219 of relay 9CS, front contact 232 of relay 10CS, wire 233, front contact 234 of relay 4WR, wire 235, front contact 236 of relay 2STP and upper winding of relay 4WC, to (−).

The picking up of relay 4WC under these conditions establishes a stick circuit for that relay including front contact 237 of relay 2STP, and front contact 39 of relay 4WC. Because of the station repeater relay 2STP being slow in dropping away, there is sufficient time at the end of the cycle for the relay 2ST to be dropped away and establish a stick circuit which has been described as being normally effective for the relay 4WC at back contact 40 prior to the opening of the temporary stick circuit which is closed at front contact 237 of relay 2STP. Thus the relay 4WC is picked up to re-establish the normally energized pick up circuit for the relay WCP at front contact 43 so as to hold relay WCP steadily picked up subsequent to the dropping away of the station relay 2ST at the end of the cycle which opens the stick circuit for relay WCP at front contact 208.

It will be noted from the above described mode of operation and the specific control circuits involved that the correspondence relay 4WC is momentarily dropped away during the execution of controls received for the track switches of the crossover 4 and is restored to its normally picked up position subsequent to the reception of these controls, only provided that the switch control relays 4WN and 4WR have been positioned in correspondence with the code that is received as indicated by the positions of the decoding relays 9CS and 10CS at the time of execution. It is therefore provided, for example, that in case a reverse control is received as has been described so that the relay 10CS is picked up for the last control step of the cycle and for some reason or other the relay 4WR does not pick up in response to this character, the pick up circuit for the relay 4WC is held open at front contact 234 of relay 4WR so that the relay 4WC remains dropped away subsequent to the deenergization of the station relay 2ST and the station repeater relay 2STP at the end of the cycle. Thus the correspondence repeater relay WCP is dropped away because of the opening of its stick circuit by the dropping away of the relay 2ST prior to the establishment of its pick up and normal holding circuit through front contact 43 of relay 4WC. Upon the dropping away of relay WCP, an indication of an out-of-correspondence condition is transmitted to the office by the circuit organization illustrated in Fig. 11 as is hereinafter more specifically considered.

For the route under consideration, another cycle of operation of the communication system follows immediately for the transmission of a control to permit the clearing of signal 11 which governs entrance to the route. The reception of this control picks up the relay 1CS, 3CS, 6CS, 7CS and 10CS in response to the respective code characters (LS), (LS), (SL), (LS), (SL) (see Fig. 6A). In accordance with the picking up of these relays CS, relay 11ST is picked up by the energization of a circuit including front contact 238 of relay 1CS, front contact 239 of relay 3CS and front contact 240 of relay 6CS.

The energization of the signal control application relay 11GZ is accomplished in a circuit network organization as illustrated in Figs. 6A and 6B in accordance with the picking up of the station relay 11ST, and in accordance with the last two characters of the control cycle received being respectively (LS) and (SL) characters. Thus the relay 11GZ becomes energized under these conditions by a circuit extending from (+), including back contact 213 of relay SA, front contact 214 of relay LV, back contact 241 of relay 2CS, back contact 216 of relay 4CS, back contact 217 of relay 5CS, back contact 218 of relay 8CS, back contact 219 of relay 9CS, front contact 242 of relay WCP, front contact 243 of relay 7CS, front contact 244 of relay 10CS, wire 245, upper winding of relay 11GZ, front contact 246 of relay 11ST, front contact 247 of relay 2WN, front contact 248 of relay 3WN, front contact 249 of relay 4WR, back contact 250 of relay 15ST, and back contact 251 of relay 15GZ, to (—). Relay 11GZ when picked up is maintained picked up by a stick circuit including front contact 252 of relay 3TR, back contact 253 of relay B, lower winding of relay 11GZ and front contact 254 of relay 11GZ, to (—). When relay 11ST is dropped away upon completion of the cycle of operation of the communication system, the closure of its back contact 255 shunts the back contact 253 of relay B out of the stick circuit just described. Relay B is a stop control relay, the function of which will be hereinafter considered when considering the mode of operation for restoration of a route which has been established.

It will be noted in the circuit just described for the picking up of relay 11GZ, that this relay can be picked up only provided that the relay WCP is in its picked position, thus checking that the switch controls that have been transmitted during one or more prior cycles of the communication system have each been properly executed in accordance with the switch control codes that have been received. In the case of the establishment of the route under consideration, if the relay 4WR for operating the track switches of crossover 4 to their reversed positions had not been picked up in accordance with the reversed control code received during the prior switch control cycle, the relay WCP would be dropped away, and because of this relay being dropped away, the relay 11GZ could not be picked up during the subsequent signal control cycle because the circuit that has just been described for the picking up of this relay would be open at front contact 242 of relay WCP. It is therefore provided that if there is failure to execute a switch control in accordance with the switch control code received, the setting up of an erroneous route is prevented by preventing the execution of the signal control that follows on a subsequent cycle, and thus prevent the clearing of a signal governing entrance to a route that has not been properly established.

To consider another condition of reception of control codes transmitted from the control office, it will be assumed that a route has been selected in response to end to end designation extending from signal 11 to signal 17 via crossover 2. The mode of operation for the transmission of controls in accordance with the selection of this route has been heretofore described, there being three cycles of operation required under the typical condition assumed, one cycle for the transmission of the switch controls for the track switches of the crossover 2, one cycle for the clearing of signal 13 and one cycle for the clearing of signal 11.

In accordance with the reception of the control cycle for the track switches of crossover 2, the code (SL), (LS), (LS), (LS), (SL), is transmitted, and the reception of this code provides for the energization of the decoding relays 2CS, 3CS, 5CS, 7CS and 10CS respectively (see Fig. 6A). The station relay 1ST is energized in response to the station selection portion of the code, such relay being energized through front contacts 205, 206, and 256 of relays 2CS, 3CS and 5CS respectively. The picking up of this relay applies stick energy to the correspondence repeater relay WCP by the closure of front contact 257 and the switch correspondence relay 2—3WC is dropped away upon the opening of its stick circuit at back contact 42. The dropping away of this relay opens the pick up and normal holding circuit for the correspondence repeater relay WCP at front contact 44. During the execution period at the end of the switch control cycle under consideration, the relay 2WR is picked up for causing the power operation of the track switches of crossover 2 to their reverse positions. Relay 2—3WC when dropped away closes a circuit whereby the relay 1STP is picked up, such circuit including back contact 258 of relay 2—3WC and front contact 259 of relay 1ST. The closure of front contact 260 of relay 1STP establishes a stick circuit to keep that relay picked up until relay 1ST is dropped away.

The circuit for the energization of relay 2WR under these conditions extends from (+), including back contact 213 of relay SA, front contact 214 of relay LV, back contact 215 of relay 1CS, back contact 216 of relay 4CS, back contact 261 of relay 6CS, back contact 218 of relay 8CS, back contact 219 of relay 9CS, front contact 220 of relay 10CS, front contact 262 of relay 1STP, wire 263, upper winding of relay 2WR, back contact 264 of relay 15GZ, back contact 265 of relay 14GZ, back contact 266 of relay 11GZ, back contact 267 of relay 12CGZ, back contact 268 of relay 12GZ, front contact 269 of relay 3L and front contact 270 of relay 7L, to (—).

When relay 2WR is picked up, the relay 2WN is dropped away by the opening of its stick circuit at back contact 28, and the closure of back contact 271 of relay 2WN provides stick circuit energization for the lower winding of relay 2WR. The control for the single track switch 3 is also communicated during the same control cycle, but inasmuch as this track switch is not required for the route being established, the control code transmitted for that track switch is in accordance with the last position to which the track switch has been operated, and thus the control transmitted is ineffective to actuate the switch control relays 3WN and 3WR from their last actuated positions. It has been assumed that the track switch 3 is in its normal position and thus the code transmitted for that track switch is for operating to its normal position as indicated by the (LS) character as the fourth character of the code. Thus energy is applied to the upper winding of relay 3WN during the execution period at the end of the cycle through back contact 213 (see Fig. 6A) of relay SA, front contact 214 of relay LV, back contact 215 of relay 1CS, back contact 216 of relay 4CS, back contact 261 of relay 6CS, back contact 218 of relay 8CS, back contact 219 of relay 9CS, front contact 272 of relay 7CS, front contact 273 of relay 1STP, wire 274, front contact 275 of relay 4WN, back contact 227 of relay 14GZ, back contact 228 of relay 11GZ and front contact 229 of relay 4L.

After the switch control relays WN and WR for the crossover 2 and the single track switch 3 have been actuated during the execution period at the end of the cycle in correspondence with the switch control codes that have been received, the correspondence check relay 2—3WC is restored to its picked up condition by the energization of a circuit extending from (+), including back contact 213 (see Fig. 6A) of relay SA, front contact 214 of relay LV, back contact 215 of relay 1CS, back contact 216 of relay 4CS, back contact 261 of relay 6CS, back contact 218 of relay 8CS, back contact 219 of relay 9CS, front contact 276 of relay 7CS, wire 277, front contact 278 of relay 3WN, front contact 279 of relay 2WR, wire 280, front contact 281 of relay 10CS, upper winding of relay 2—3WC and front contact 282 of relay 1STP, to (—). Relay 2—3WC when picked up by the energization of this circuit establishes a stick circuit for its lower winding extending from (+), including front contact 283 of relay 1STP, front contact 41 of relay 2—3WC and lower winding of relay 2—3WC, to (—). This stick circuit maintains the relay 2—3WC energized at the end of the cycle upon termination of the execution period until the station relay 1ST has had time to be dropped away and to re-establish a stick circuit at back contact 42 by which the relay 2—3WC is normally maintained energized. Relay 2—3WC when picked up closes its front contact 44 to provide energization of the correspondence repeater relay WCP so that such relay is maintained picked up subsequent to the opening of its stick circuit at front contact 257 of relay 1ST.

According to the mode of operation that has been described for the transmission of controls from the control office, the next cycle of operation of the communication system is for the communication of a cycle for the clearing of signal 13, and thus the code transmitted during this particular cycle of operation comprises the characters (LS), (SL), (SL), (LS), (SL) respectively. This code provides for the energization of the decoding relays 1CS, 4CS, 6CS, 7CS, and 10CS. The station relay 13ST (see Fig. 6A) for signal 13 is picked up upon the reception of this code by the energization of a circuit extending from (+), including front contact 238 of relay 1CS, front contact 284 of relay 4CS, front contact 285 of relay 6CS, front contact 286 of relay 7CS, front contact 287 of relay 10CS, and winding of relay 13ST, to (—).

Relay 13GZ is picked up during the execution period of the cycle of operation under consideration by the energization of its upper winding in a circuit extending from (+), including back contact 213 (see Fig. 6A) of relay SA, front contact 214 of relay LV, back contact 241 of relay 2CS, back contact 288 of relay 3CS, back contact 217 of relay 5CS, back contact 218 of relay 8CS, back contact 219 of relay 9CS, front contact 242 of relay WCP, front contact 243 of relay 7CS, front contact 244 of relay 10CS, wire 245, upper winding of relay 13GZ, front contact 289 of relay 13ST, front contacts 290 and 290A of relay 4WN, back contact 250 of relay 15ST, and back contact 251 of relay 15GZ, to (—). Relay 13GZ when thus picked up is maintained energized by a stick circuit extending from (+), including front contact 291 of relay 8TR, back contact 292 of relay B, lower winding of relay 13GZ, and front contact 293 of relay 13GZ, to (—). Back contact 294 of relay 15ST is included in multiple with back contact 292 of relay B as a means for selectively controlling the restoration of the signal control relays GZ in a manner to be more readily understood as the description progresses. It will be noted that the relay 13GZ can be picked up in response to the reception of the signal control code, only provided that the switch correspondence relay for both switch stations are both in their normally energized positions which is indicative of the switch control relays WN and WR being properly conditioned in accordance with switch controls that have been communicated by code from the control office for the route being established.

Subsequent to the control cycle that is transmitted for the clearing of signal 13, a cycle of operation is transmitted as has been described for the clearing of signal 11, and the reception of this cycle at the track layout is effective to actuate the station relay 11ST in a manner comparable to that which has been described when considering the transmission of a control for clearing signal 11 for another route. The energization of relay 11GZ for clearing signal 11 for the route from signal 11 to signal 17 via crossover 2 extends from (+), including back contact 213 (see Fig. 6A) of relay SA, front contact 214 of relay LV, back contact 241 of relay 2CS, back contact 216 of relay 4CS, back contact 217 of relay 5CS, back contact 218 of relay 8CS, back contact 219 of relay 9CS, front contact 242 of relay WCP, front contact 243 of relay 7CS, front contact 244 of relay 10CS, wire 245, upper winding of relay 11GZ, front contact 246 of relay 11ST, front contact 295 of relay 2WR, and front contact 296 of relay 13GZ, to (—). This relay when picked up is maintained energized by a stick circuit which has been described.

From the foregoing description as to the circuits involved in the energization of the switch and signal control application relays, it will be noted that there are several principles of operation that are characteristic of these circuits, and which are characteristic of other circuits that may be required to be provided in practice for different types of track layouts. There are as many switch control stations provided as are required for the communication of controls for all of the track switches in the track layout, and in addition to a station relay ST that is provided for each switch station, there is a correspondence relay WC provided as being associated with each station relay ST, and also a station repeater relay STP which facilitates restoration to a normally energized condition of the associated relay WC at the end of a cycle of operation of the communication system. As has been described, the switch correspondence relay WC for each station is maintained normally energized and is dropped away in response to the picking up of the associated station relay ST during the reception of a switch control for that station, such relay being immediately restored to its pick up position upon the execution of the switch controls communicated during that control cycle, only provided that the switch control relays WN and WR for each track switch controlled during that cycle are conditioned in correspondence with the respective normal and reverse switch control codes that are received by the decoding relays CS.

In addition to the correspondence check provided by the relays WC for their respective associated switch control stations, the switch correspondence repeater relay WCP is so controlled by the relays WC and ST that it is maintained steadily energized except when there is a failure of the switch control relays to respond in correspondence during any switch control cycle in the setting up of a route. In other words, the relay WCP is deenergized whenever either of the relays WC is deenergized for an abnormal period of time. It is thus provided that after transmission of the respective switch control cycles required for positioning all of the track switches in a route designated for establishment, if the relay WCP is in its dropped away position, it is indicative that there has been a failure to properly execute the control for a track switch which has been transmitted for the establishment of that route.

It has thus been provided by the inclusion of the front contact 242 (see Fig. 6A) of relay WCP in the execution for all of the signal control application relays GZ that the control for permitting the clearing of a signal governing entrance to a route is not executed at such times as when it is indicated by the deenergizing condition of the relay WCP that there has been failure to properly execute a switch control for the establishment of that route during a prior cycle of operation of the communication system.

It will be further noted that the energization of any switch control relay WN or WR during the execution period at the end of a switch control cycle is dependent upon checking that all opposing signals governing traffic over the associated track switches are at stop, and checking that the lock relays L for the detector track sections associated with the track switches to be controlled are energized as being indicative that there is no locking to interfere with the immediate power operation of the associated track switch. Thus there can be no preconditioning of a track switch if it is not free to be actuated when the switch control is executed.

From the circuits that have been described for the energization of the signal control application relays 11GZ and 13GZ, it will be readily apparent that these relays are energized in a symmetrical circuit network organization having circuit branches comparable to the respective track portions of the track layout and selections comparable to the respective normal and reverse positions which have been defined by the selective control of the switch control relays WN and WR for the respective track switches.

*Switch and signal controls.*—Having thus considered the manner in which the switch and signal control codes are received at the track layout and application relays are picked up in accordance with these codes, consideration will now be given to the control of the respective switch and signal units in accordance with the positioning of the application relays.

The switch machines for operating the track switches of the respective crossovers and the single track switch are controlled as to their direction of operation in accordance with pole changing contacts on the associated switch control relays WN and WR in accordance with the requirements of practice. One typical type of control is indicated in Fig. 8 for the control of the track switches of the crossover 4 wherein energy applied to the switch machines for the crossover is selected as one polarity or another by the contacts 297 and 298, and 299 and 300 of relays 4WN and 4WR respectively, whereby the switch machine 4SM, for example is energized with one polarity when the relay 4WN is picked up for effecting the power operation of its associated track switch to its normal position, and whereby the energization of the relay 4WR is effective to apply the opposite polarity to the switch machine control wires 301 and 302 and thereby cause the switch machine 4SM to be driven in the opposite direction.

For the control of the signals, the energization of respective signal control application relays GZ as has been described provides for the energization of relays G for the associated signals through another circuit network organization as illustrated in Fig. 7 in a manner to check that the track switches for the alignment of the route to be established have completed their operation in correspondence with the switch positions that have been called for. Thus this circuit network for the energization of the relays G has its selections made by normal and reverse correspondence relays MCR and RCR for the respective crossovers and the single track switch, the relays NCR and RCR for each crossover and each single track switch being controlled by a polarized circuit selected through switch circuit controllers associated with the switch machines in a manner comparable to that which has been illustrated in Fig. 8 as being associated with the control of the relays 4NCR and 4RCR for the crossover 4. These relays are of the biased polar type and thus respond only to the single polarity of energization that is normally applied for their control circuit. The relay 4NCR is normally energized in a manner which has been heretofore considered, and when the track switches of the crossover 4 are power operated to their reversed positions, the relay 4NCR is dropped away upon the dropping away of relay 4WN to open its circuit at front contact 46, and the reverse correspondence relay 4RCR is picked up through front contact 47 of relay 4WR after the track switches of crossover 4 have completed their operation to their respective reverse positions.

If it is assumed that the route is being established from signal 11 to signal 17 via crossover 4, the relay 11GZ (see Fig. 6B) is picked up during an execution period at the end of a signal control cycle of the communication system as has been described, and the picking up of this relay conditions a circuit for picking up the relay 11G (see Fig. 7), at such time as when the track switches are all positioned in correspondence with the switch controls that have been called for in the establishment of the route. Thus for the specific condition under consideration, the picking up of the reverse correspondence relay 4RCR for the crossover 4 provides for the energization of relay 11G through a circuit extending from (+), including back contact 303 of relay 15GZ, front contact 304 of relay 8TR, front contact 305 of relay 4RCR, back contact 306 of relay 4NCR, front contact 307 of relay 4TR, front contact 308 of relay 3NCR, front contact 309 of relay 2NCR, front contact 310 of relay 3TR, front contact 311 of relay 11GZ and winding of relay 11G, to (−).

The picking up of relay 11G under these conditions applies energy to the mechanism of the searchlight signal 11 through front contacts 312 and 313 which is of a polarity selected through the contacts 314 and 315 of the yellow-green repeater relay 17GYP for the signal 17.

Having thus described typical specific conditions for the power operation of certain of the track switches and signals, it is to be understood that the mode of operation for the control of other switches and signals for the establishment of other routes is accomplished by a similar mode of operation.

*Call-on and non-stick signal control.*—There are certain conditions encountered in practice where it is desirable to be able to leave a route established for successive train operations rather than requiring that the route be manually designated for the passage of each train. Under these conditions, the entrance point for the route under consideration is provided with an entrance button NB which has a distinctive position (generally a rotated position) in which it maintains the associated entrance relay NR steadily energized, irrespective of the interruption of the stick circuit for that relay each time a train accepts the associated signal. It may be further provided that a low speed call-on signal can be designated by an entrance button NB, and this is accomplished generally in practice by a position of the entrance button NB (such as a rotated position) that is distinctive from a rotated position which can be used for designation of non-stick control for a high signal. It is thus illustrated in Fig. 5, that an entrance button 12NB for example, for signal 12 can have respective clockwise and counter-clockwise contacting positions for selecting the energization of the relays 12NR and 12CNR respectively in order to be able to selectively designate as to whether a designated entrance is for a non-stick high signal or for a call-on signal.

If it is assumed that a non-stick high signal control is to be transmitted for a route having an entrance point at signal 12, the button 12NB is rotated in a clockwise direction, and by such rotation the entrance relay 12NR is directly energized through the commutator contact 316 of the button 12NB and through its upper winding so as to maintain relay 12NR picked up in response to entrance designation for as long a time as the button 12NB may be permitted to remain in its clockwise rotated position. Relay 12NR when picked up under these conditions is effective in the establishment of a route having an entrance point at signal 12 in a manner comparable to that which has been described. The mode of operation upon restoration which differs from the mode of operation where stick signal control is employed will be hereinafter considered when considering specifically the mode of operation upon the passage of a train.

Similarly if the button 12NB, for example, is rotated in a counter-clockwise direction for designation of a call-on control for signal 12, the call-on entrance relay 12CNR is picked up in preference to the relay 12NR by the energization of its lower winding through the commutator contact 317 of the button 12NB in its counter-clockwise rotated position.

The picking up of the call-on entrance relay 12CNR applies energy to the initiating circuit network at front contact 318 (see Fig. 2A) in multiple with the front contact 319 of relay 12NR so that the mode of operation in the selection of the positions of the track switches for a route emanating from signal 12 is accomplished in the same manner, irrespective of whether the entrance control is designated by the pushing of the entrance button 12NB, or by the rotation of that button to designate a call-on or non-stick high signal control for the signal 12. In accordance with call-on control having been designated and the relay CNR picked up, the signal control cycle that is transmitted in the establishment of a route extending from signal 12 is distinctively characterized according to the code chart of Fig. 12 to provide that the last two characters transmitted are both (LS) characters, which is indicative of a call-on control. These characters are selected for transmission during the cycle for the signal 12 in accordance with the closure of front contacts 320 and 321 of relay 12CNR (see Fig. 3C). Thus upon application of energy to the control channel wire No. 4, the relay LS is energized for the transmission of an (LS) character through front contact 322 of relay 12LC, front contact 323 of relay 12RC, back contact 324 of relay 12NR, and front contact 320 of relay 12CNR. Similarly the relay LS is energized when energy is applied to the control channel wire No. 5 through front contact 325 of relay 12LC, front contact 326 of relay 12RC, back contact 327 of relay 12NR and front contact 321 of relay 12CNR.

Upon reception at the track layout of a signal control cycle of operation for the control of signal 12 that has been transmitted in response to the designation of a call-on control as has been heretofore described, the signal station relay 12ST (see Fig. 6A) is picked up according to the general mode of operation such as has been considered, and during the execution period at the end of the cycle, the call-on application relay 12CGZ is picked up instead of the relay 12GZ which would be energized in response to designation of conventional high signal control for signal 12. Thus because of the relays 7CS and 9CS being picked up during the cycle of operation under consideration, the call-on relay 12CGZ has its upper winding energized during the execution period at the end of the cycle by a circuit extending from (+), including back contact 213 of relay SA, front contact 214 of relay LV, back contact 241 of relay 2CS, back contact 238 of relay 3CS, back contact 261 of relay 6CS, back contact 218 of relay 8CS, back contact 328 of relay 10CS, front contact 242 of relay WCP, front contact 243 of relay 7CS, front contact 329 of relay 9CS, wire 330, upper winding of relay 12CGZ, back contact 331 of relay 12GZ, front contact 332 of relay 12ST, front contact 333 of relay 2WN and front contact 296 of relay 13GZ, to (—). This is assuming that a route has been already established for passage of the train past signal 13, but if this is not true the circuit for relay 12CGZ must extend through back contact 296 of relay 13GZ, back contact 334 of relay 13ST, front contact 290 of relay 4WN, back contact 250 of relay 15ST and back contact 251 of relay 15GZ to (—). If the track switches of crossover 4 are called for to be operated to their reverse positions, energy for relay 12CGZ can be obtained through front contact 335 of relay 4WR. The relay 12CGZ when picked up in this manner is maintained picked up by a stick circuit extending through front contact 336 of the track relay 7TR, back contact 337 of the relay B, lower winding of relay 12CGZ, and front contact 339 of relay 12CGZ. The inclusion of back contact 340 of the station relay 12ST in multiple with back contact 337 of relay B is provided for restoration purposes to be more readily apparent as the description progresses.

Relay 12CGZ when picked up under these conditions causes a tumble down of route locking stick relays ES according to the general mode of operation provided for route locking and thus the relay 7ES (see Fig. 7) is dropped away by the picking up of relay 12CGZ. The circuits for the route locking relay 7ES, and for other route locking relays have not been shown as the circuits for the control of route locking stick relays of this character are well known, and can be provided, for example, according to principles disclosed in my above mentioned prior Patent No. 2,298,946, dated October 13, 1942. The relay 9ES in Fig. 5 of that patent can be considered comparable to the relay 7ES of the present application, and this relay 9ES is illustrated as being deenergized by the picking up of the call-on signal control relay 12CG to open its back contact 256, the relay 12CG of that patent being considered as comparable for route locking purposes to the call-on execution relay 12CGZ of the present invention. Relay 12CG (see Fig. 7) thus becomes energized by a circuit extending from (+), including back contact 341 of relay 7ES, back contact 342 of relay 2RCR, front contact 343 of relay 2NCR, front contact 344 of relay 12CGZ, back contact 345 of relay 12GZ, and winding of the signal control relay 12CG, to (—). The closure of front contacts 346 and 347 of relay 12CG applies energy directly to the call-on signal 12B.

*Restoration to normal.*—The restoration of the parts of the system associated with the setting up of a route to normal can be effected manually, or by automatic control dependent upon passage of a train. To consider a typical example of how restoration may become effective upon passage of a train, it will be assumed that a route has been established as has been heretofore described from signal 11 to signal 17 via crossover 4, and that a train accepts the signal 11 and enters the track section 3T (see Fig. 8).

With reference to Fig. 6B, the stick circuit for the relay 11GZ is interrupted when the train enters track section 3T upon the dropping away of the track relay 3TR by the opening of front contact 252 prior to the closure of back contact 348 of the slow acting track repeater relay 3TP. Thus the relay 11GZ is dropped away, its pick up circuit being normally open, and being closed only momentarily during the execution of a signal control transmitted during a control cycle for the energization of that relay from the control office. The dropping away of relay 11GZ opens the circuit for the signal control relay 11G at front contact 31 (see Fig. 7), and the dropping away of relay 11G deenergizes the mechanism of signal 11 by opening front contacts 312 and 313 and shunts the signal control wires to insure the restoration of signal 11 to its stop indicating position.

With reference to Fig. 11, the dropping away of the track relay 3TR is also effective to initiate the transmission of an indication cycle to the control office so as to similarly condition the indication track relay TK at the control office. Thus the shifting of contact 349 of relay 3TR interrupts the stick circuit for the change relay $CH^2$ and initiates a cycle of operation for the transmission of indications to the control office during which cycle the indication station relay $LC^2$ is picked up in accordance with the usual practice for the communication of indications where a plurality of indication stations are involved. Thus all indications are communicated during the cycle that has been initiated which are associated with that indication station. During this cycle of operation, the circuit connection, including front contact 350 of relay 3TR and front contact 351 of relay $LC^2$, is open at front contact 350 of relay 3TR so that the reception of this indication cycle at the control office is effective to actuate the magnetic stick track 3TK (see Fig. 3D) to its dropped away position. The dropping away of this relay at the control office also deenergizes its slow acting track repeater relay 3TKP.

Because of the signal control relay 11G being dropped away, an indication is communicated during the same indication cycle that the signal 11 has been restored to stop because of the circuit connection including front contact 352 (see Fig. 11) of relay 11G and front contact 353 of of relay $LC^2$ being open at front contact 352 of relay 11G during the transmission of the indication cycle.

At the control office, the dropping away of the track indication relay 3TK prior to the dropping away of its slow acting repeater relay 3TKP opens the stick circuit by which the relay 11RC (see Fig. 3C) has been maintained picked up at front contact 294, and relay 11RC is dropped away at this time because its pick up circuit is open at its front contact 143 of the change relay 11CH.

If it is assumed that the route has been originally set up by stick signal control designation (designation by pushing the entrance button 11NB rather than rotating it in either direction) the entrance relay 11NR is also dropped away upon the interruption of its stick circuit by the dropping away of the magnetic stick track indication relay 3TK. Thus with reference to Fig. 4, the dropping away of relay 3TK prior to the dropping away of its repeater relay 3TKP opens the stick circuit for the relay 11NR at front contact 56 so that this relay is dropped away in response to entrance of the train into the track section 3.

Because of the deenergization of the relay 11NR, energy is removed from the initiating circuit network at front contact 58 (see Fig. 2A) and the removal of this energy deenergizes the exit relay 15XR which has been picked up for the route under consideration.

Relay 15XR in dropping away removes energy from the pick up circuit network organization for the energization of the switch position selecting relays at front contact 71 (see Fig. 3B), but these relays are maintained picked up dependent upon the route locking in a manner and for reasons pointed out in my above mentioned prior patent. Thus the relay 4R which has been picked up for the route under consideration is maintained picked up by the stick circuit which is closed at this time for its lower winding in accordance with the lock indication relays 4LK and 8LK being in their dropped away positions. These magnetic stick relays are actuated to their dropped away positions as well as the lock indication relays for the other detector track sections including in the route upon route establishment in accordance with indications transmitted via the code communication system from the track layout. More specifically, upon the route locking becoming effective according to the usual practice in systems of this type for the route under consideration, the lock relays 3L, 4L, and 8L (see Fig. 11) have been dropped away, and the dropping away of any one of these relays is obviously effective to initiate the transmission of an indication cycle during which the relay $LC^2$ is picked up, and during which the respective channels assigned to the communication of lock indications are open at front contacts 357, 358, and 359 of relays 3L, 4L and 8L so that the corresponding lock indication relays 3LK, 4LK (see Fig. 3D) at the control office are actuated to their dropped away positions.

It has thus been provided that the lower winding of relay 4R is energized by a stick circuit (see Fig. 3B) including back contact 360 of relay 4LK, back contact 361 of relay 4AN, and front contact 362 of relay 4R. Another stick circuit is also closed for this relay through back contact 363 of the lock indication relay 8LK and front contact 364 of relay 4R.

The switch position selecting relay 3N for the single track switch 3 is maintained picked up under these conditions through back contact 365 of relay 4LK (see Fig. 3B), wire 366, back contact 367 of relay 3R and front contact 368 of relay 3N. The relay 2AN for the crossover 2 is maintained picked up in accordance with the lock indication relay 3LK being in its dropped away position by a stick circuit including back contact 369 of relay 3LK and front contact 370 of relay 2AN.

The principal reason for maintaining these switch position selecting relays energized when the lock relays for the corresponding track switches are deenergized is to maintain contacts open in the initiating circuit networks to prevent the preconditioning of conflicting routes in a manner which has been specifically considered in my above mentioned prior patent.

It is thus provided that only partial restoration of the apparatus associated with the establishment of a route becomes effective upon the entrance of a train into a route, and the restoration of the switch position selecting relays becomes effective as the train progresses through the route in accordance with the release portions of the route which are released by rear release route locking according to principles well known by those familiar with the art and as has been specifically described in my above mentioned prior patent.

When the train leaves the track section 3T in progressing through the route, the picking up of the track relay 3TR for that track section permits the restoration of the lock relay 3L (see Fig. 11) for that track section to its picked up position, and the shifting of the contact 371 of that relay initiates another indication cycle during which the closure of the front contact 357 of relay 3L provides for the picking up of the block indication magnetic stick relay 3LK (see Fig. 3D) at the control office. The stick circuit for the relay 2AN is thus opened at back contact 369 to permit the dropping away of that relay. This releases the crossover 2 from the route and thus provides by the closure of back contact 93 (see Fig. 2A) in the initiating circuit network that a route can be established over the crossover 2 with its track switches in their reverse positions if desired.

Similarly, the relay 3N has its stick circuit opened as the train progresses so as to leave the track section 4T, and finally the train upon leaving the track section 8T permits the completion of the restoration of the lock relays L and lock indication relays LK to their normally picked up positions. Thus the picking up of the lock indication relay 8LK at the control office opens the stick circuit for the switch position selecting relay 4R at back contact 363 (see Fig. 3B), the other stick circuit for this relay having been opened prior to that time by the picking up of the relay 4LK at back contact 360.

If, rather than a route being designated for stick control of the signal governing entrance to the route, the entrance button is rotated in one direction or another for non-stick designation as has been heretofore described, the entrance relay NR or CNR as the case may be is maintained steadily picked up when an indication is received that the track section in advance of the signal has become occupied by the entrance of a train into the route. Thus, under these conditions, there is no restoration of the exit relay for the route under consideration, and the pick up circuits for the switch position selecting relays for that route are maintained closed, and thus the restoration of these relays is not dependent upon the route locking as the train progresses as has been described under the above considered condition, but is dependent upon the entrance relay NR or CNR, which in turn is dependent upon the associated entrance button NB being maintained in its rotated position.

To consider a typical condition upon passage of a train where non-stick signal control is provided, it will be assumed that a route has been set up according to the mode of operation that has been described for passage of an eastbound train from signal 12 to signal 13. It will also be assumed that the entrance point for this route has been designated by the rotation of the entrance button 12NB (see Fig. 5) in a clockwise direction so as to directly energize the entrance relay 12NR through the commutator contact 316 of the entrance button 12NB. In the course of the establishment of the route, the track switches of the crossover 2 are operated to their normal positions in accordance with the energization of the relay 2BN (see Fig. 3A), and in accordance with the response of the relay 2NWZ in correspondence with the normal switch positions selected. The correspondence check relay 12RC (see Fig. 3C) for signal 12 is picked up and maintained picked up by its stick circuit. This stick circuit extends from (+), including front contact 373 of relay 12CNR, front contact 374 of relay 12RC, front contact 375 of relay 7TK and lower winding of relay 12RC, to (−).

When the train accepts the signal 12 and enters the track section 7T, the track relay 7TR which is associated with that track section is dropped away, and an indication is transmitted to the control office to effect the actuation of the magnetic stick track indication relay 7TK (see Fig. 3D) to its dropped away position. The dropping away of this relay opens the stick circuit for the relay 12 RC (see Fig. 3C) at front contact 375. The dropping away of relay 12RC under these conditions establishes a pick up circuit for the change relay 12CH upon the closure of back contact 376 because the exit relay 12XR is still maintained picked up and thus feeds energy through the completion circuit network to energize the relay 12CH in accordance with the non-stick designation that has been made for the entrance point at signal 12. The circuit by which the relay 12CH is energized under these conditions extends from (+), including front contact 89 of relay 13XR, (see Fig. 3B), wire 90, front contact 91 of relay 2BY, front contact 377 of relay 2BN, front contact 378 of relay 2NWZ, wire 379, back contact 376 of relays 12RC, upper winding of relay 12CH, cancel bus 117, and normally closed contact 118 of the cancel button CNPB, to (−).

The relay 12CH therefore becomes picked up for the automatic initiation of a signal control cycle for the transmission of a signal clearing code to signal 12 so that the relay 12GZ (see Fig. 6B) is picked up according to a principle of operation that has been described to condition the system so that the signal 12 can be cleared for the passage of a second train. Thus the signal 12 is automatically restored to stop upon the passage of a train, and is automatically actuated to provide a clear indication for the following train for the passage of as many trains as may be desired, provided that the entrance button 12NB for the associated entrance point is maintained in its clockwise rotated position as has been described.

For the high signal 12A, the above described mode of operation is desirable because it readily adapts the route establishing apparatus for use in either the stick or non-stick control of the signal. That is, if stick control is to be used, it is necessary that the relays 12GZ, 12RC, and 12NR be dropped away automatically upon the entrance of a train into a route. After providing for this mode of operation, the system is readily adapted for non-stick operation by providing the means which has been described for immediately restoring the relays 12GZ and 12RC to their picked up positions subsequent to the entrance of a train into the route, the relay 12GZ being picked up via the code communication system.

Although the control of a call-on signal may be readily provided as a stick or a non-stick control, it is quite often required in practice that a manual operation be made for the clearing of a call-on signal for a second train. It is this type of control that is illustrated in this embodiment of the present invention wherein the call-on application relay 12CGZ (see Fig. 6B) for signal 12B, for example, has its stick circuit dependent upon the track relay 7TR for the track section 7T immediately in advance of signal 12. Thus when a train accepts the signal 12B and enters the track section 7T in advance of that signal, the relay 12CGZ is dropped away, and the signal 12B is put to stop.

Under the conditions which are being considered the occupancy of the track section 7T by the train does not effect the dropping away of any route establishment relays at the control office as the relay 12RC (see Fig. 3C) is maintained picked up through front contact 380 of relay 12CNR, irrespective of the dropping away of the track indication relay 7TK. The relay 12CNR (see Fig. 5) is maintained steadily picked up through the commutator contact 317 on the push button 12NB. It is thus provided that the entire route is maintained established as far as the apparatus at the control office is concerned, but there is no cycle of operation initiated for the transmission of a control for the call-on signal 12B to permit the clearing of that signal for a second train because the pick up circuit for the start relay 12CH (see Fig. 3C) is held open at back contact 376 of relay 12RC. It is thus required that in order to clear a call-on signal for a second train, it is necessary to actuate the entrance button 12NB by rotation to its normal position to effect the restoration of the relays 12CNR and 12RC and then actuate the button back to its counter-clockwise rotated position so as to again pick up the relay 12CNR and proceed further to set up a route for a second train according to the usual procedure by entrance-exit designation. Only by this mode of operation, according to this embodiment of the present invention, can the system be set into operation for the transmission of a control to pick up the relay 12CGZ at the track layout (see Fig. 6B) and thereby permit the energization of the call-on signal 12B for governing passage of a second train.

For manual restoration of a route that has been established, without passage of a train, the restoration is generally initiated by the pulling out momentarily of the entrance button NB for the entrance end of the route to be restored, but in case the entrance point has been designated by rotation of the entrance button NB for call-on or non-stick signal control, the restoration is designated by the restoration of that entrance button NB to its normal position with respect to rotation.

For manual restoration, without a train having entered a route, the operator has only to pull out the entrance button NB (when entrance has been designated for high stick signals), and this operation restores the associated entrance relay NR and also initiates the system into a cycle of operation for the transmission of a stop control to the remote track layout. A typical circuit illustrating the initiation of this mode of operation is shown in Fig. 4 for the apparatus associated with the entrance point at signal 11, and this circuit is to be considered as typical of the circuit organization that can be provided for the other entrance points in the track layout.

If it is assumed that a route has been established as has been described from signal 11 to signal 17 via crossover 4, the entrance relay 11NR is maintained picked up by a stick circuit which has been described extending through a normally closed contact 55 of the entrance button 11NB. If it is desired to restore the signal 11 to stop, and restore the parts of the system associated with the establishment of the route to their normally deenergized condition, the button 11NB is pulled out from its normal position, and thus the stick circuit for relay 11NR is opened at contact 55 of button 11NB. The dropping away of relay 11NR is effective to cause the restoration of the switch position selecting relays and the exit relay 15XR in a manner comparable to that which has been described as being effective for restoring the exit relay 15XR and opening the pick up circuits for the switch position selecting relays when considering restoration upon passage of a train.

Figure 3C:
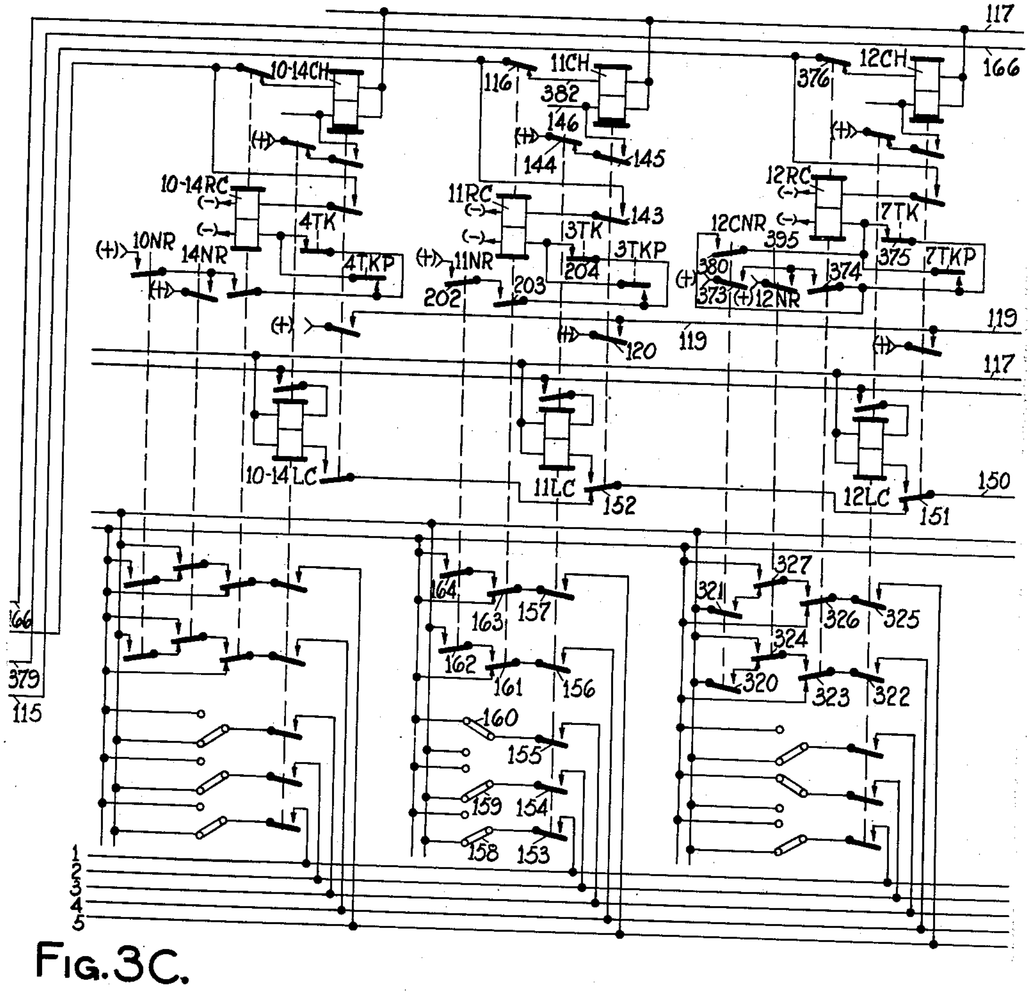
Figure 3D:
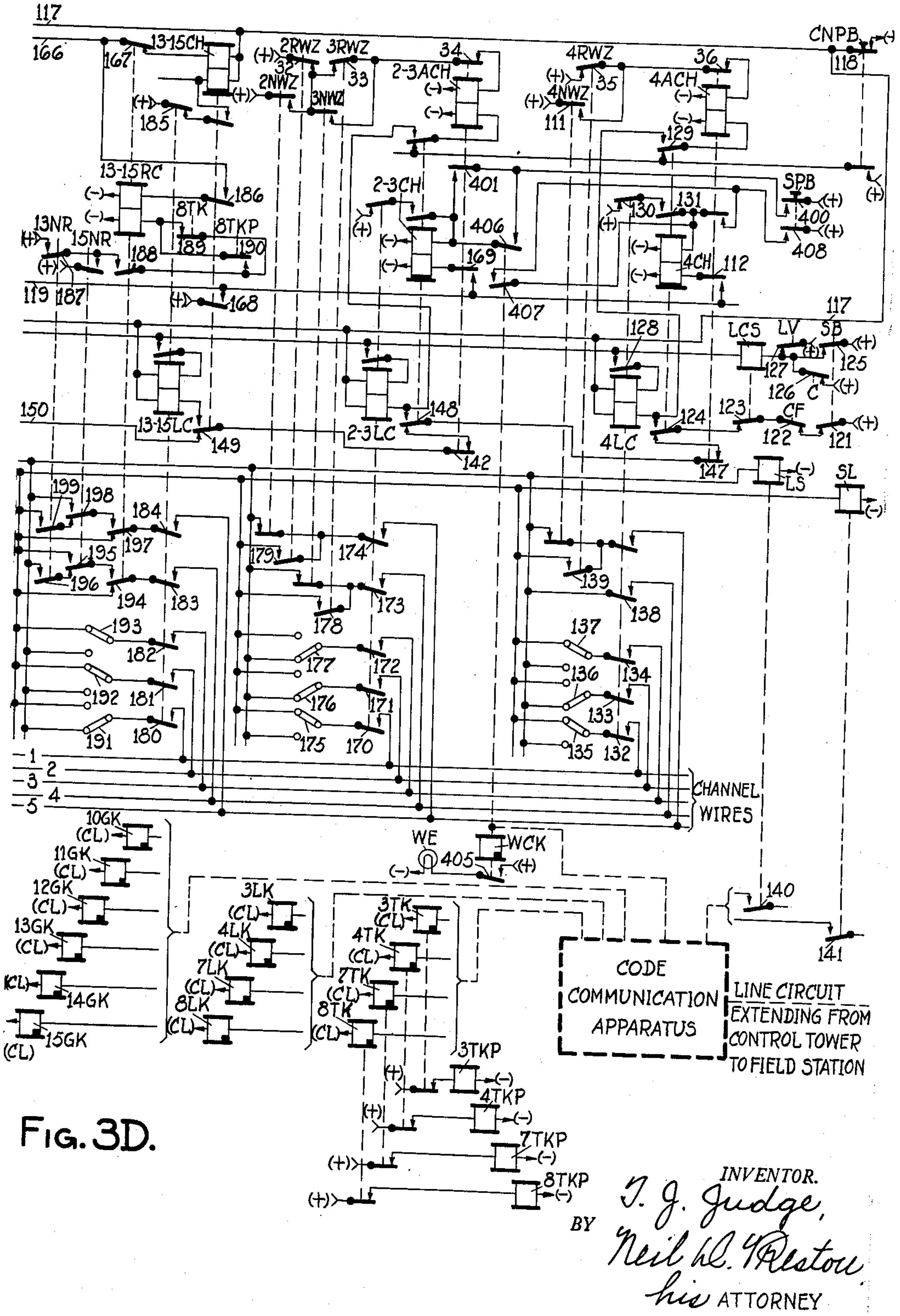

With reference to Fig. 4, the pulling out of button 11NB, in addition to opening the stick circuit for relay 11NR, establishes a pick up circuit for the start relay 11CH which is associated with the initiation of the transmission of controls for signal 11 (see Fig. 3C). The lower winding of this relay 11CH is energized at this time through contacts 55 (see Fig. 4) of button 11NB, back contact 381 of relay 11LC and wire 382. Relay 11CH when picked up initiates a control cycle for the signal station 11 by closing a pick up circuit for relay 11LC as illustrated in Fig. 3C which has been described in connection with a consideration of the original establishment of the route emanating from signal 11.

In accordance with the entrance relay 11NR being dropped away, the stick circuit for the correspondence check relay 11RC (see Fig. 3C) is opened at front contact 202, and thus the relay 11RC, as well as the relay 11NR, is dropped away at this time when the control cycle is transmitted for restoration of signal 11 to stop. It is therefore provided that the last two characters of the code transmitted are selected as being both (SL) characters in accordance with the closure of back contacts 161 and 163 of relay 11RC. This provides for the transmission of a stop code having characters selected as called for by the code chart of Fig. 12.

The reception at the track layout of this stop control cycle for signal 11 picks up the station relay 11ST (see Fig. 6A) by the energization of a circuit which has been described, and the stop relay B (see Fig. 6B) is picked up during the execution period at the end of the cycle by a circuit extending from (+), including back contact 213 of relay SA, front contact 214 of relay LV, back contact 241 of relay 2CS, back contact 216 of relay 4CS, back contact 217 of relay 5CS, back contact 383 of relay 7CS, back contact 219 of relay 9CS, front contact 242 of relay WCP, front contact 384 of relay 8CS, front contact 385 of relay 10CS, back contact 386 of relay 1STP, back contact 387 of relay 2STP, wire 388, and winding of relay B, to (−).

Relay B when picked up opens the stick circuit for the lower winding of relay 11GZ at back contact 253, and because of the back contact 255 of the station relay 11ST being open at the same time, the relay 11GZ is dropped away. Relays GZ for other stations which may be picked up at this time are not affected because of the back contacts of relay B in their stick circuits being shunted by back contacts of the associated station relays ST. The dropping away of relay 11GZ under these conditions restores the signal 11 to stop by the deenergization of relay 11G upon the opening of front contact 311 (see Fig. 7), and the relay 11G by contacts 312 and 313 in turn removing energy from signal 11 and applying a shunt across the control wires for that signal.

In accordance with the restoration of the signal 11 to stop under these conditions, the restoration of the route locking becomes effective according to the usual practice, it being preferable that suitable approach locking means be provided as is disclosed, for example, in my prior patent wherein the restoration of the approach locking relays ES and WS, and the restoration of the lock relays L, is dependent upon an approach locking relay AS which is associated with the signal and may be immediately restored when the signal is put to stop, only provided that there is no train immediately in approach of the signal. After the lock relays L have been restored to their normally energized conditions, indications of the restoration of these relays are transmitted to the control office as is indicated and as has been described with reference to Fig. 11. It is thus provided for the restoration of the route under consideration that the relays 3LK, 4LK and 8LK at the control office (see Fig. 3D) are actuated to their picked up positions in response to the release of the locking in the field for the route, and the picking up of these relays opens respective stick circuits for the switch position selecting relays N, AN, BN, and R for the respective crossovers and single track switch included in the route under consideration so that these relays are dropped away. The specific stick circuits involved have been considered in detail when considering restoration upon passage of a train.

Having thus considered the manner in which restoration of an established route can be made in response to manual designation for a route that has been set up for stick signal control, consideration will now be given as to the mode of operation for restoration where non-stick or call-on signal control has been designated by the rotation of the entrance button NB for the entrance end of the route in one direction or another in accordance with whether a high signal or a call-on signal has been designated. A typical circuit organization wherein such restoration designation can be effective is shown in Fig. 5 as being provided for the designation of entrance at signal 12.

It is provided according to the circuit organization of Fig. 5 that the rotation of the button 12NB clockwise for designating a non-stick high signal, in addition to picking up the entrance relay 12NR also energizes the upper winding of the call-on entrance relay 12CNR through front contact 389 of relay 12NR. The picking up of relay 12CNR along with relay 12NR under these conditions does not affect the selection and the establishment of the route other than providing establishment the same as would be accomplished by the picking up of the entrance relay 12NR alone, but the relay 12CNR when picked up under these conditions provides a means for facilitating restoration upon restoration of the entrance button 12NB to its normal position with respect to rotation. Thus, if it is assumed that a route is to be restored which has been designated by the rotation of the button 12NB in a clockwise direction (high non-stick signal designation), the operator has only to restore the button 12NB by rotating it counter-clockwise to its normal position, and upon restoration to its normal or center position with respect to rotation, a circuit is closed for the start relay 12CH so as to initiate a cycle of operation for transmission of a stop control to the track layout for signal 12. The relays 12NR and 12CNR have their circuits opened upon the restoration of button 12NB in this manner, but the relay 12CNR is made sufficiently slow in dropping away so that a circuit is closed momentarily for the lower winding of relay 12CH when the button is restored extending from (+), through normally closed commutator contact 390 of button 12NB, normally closed push button contact 391 of button 12NB, front contact 392 of relay 12CNR, back contact 393 of relay 12LC, wire 394, lower winding of relay 12CH, cancel bus 117 (see Fig. 3C) and normally closed contact 118 of the cancel button CNB (see Fig. 3D), to (—).

It will be readily apparent from the circuit organization according to Fig. 5 that a similar mode of operation is effective for initiating the start for transmission of a stop control for signal 12 upon restoration of the button 12NB from its counter-clockwise rotated position which is used for designating a call-on indication for signal 12 rather than a high signal indication. The same stop code is transmitted for restoration of a signal, irrespective of whether it has been a stick or non-stick control that has been employed, and irrespective of whether it has been a high signal or a call-on signal that has been cleared. It is thus provided that the transmission of a stop control under these conditions is effected by a mode of operation similar to that which has been described for the transmission of a stop control for signal 11. In the case of signal 12, it will be noted that the relay 12RC (see Fig. 3C) is dropped away by the opening of its stick circuit upon the dropping away of whichever of the relays 12CNR or 12NR has been picked up so as to open respectively front contacts 373 and 395. Relay 12RC when dropped away selects by its back contacts 323 and 326 that the last two characters of the stop control cycle to be transmitted for signal 12 are (SL) characters.

Reception at the track layout of a stop control for signal 12 is effective to pick up the stop relay B (see Fig. 6B) during the execution period at the end of the cycle in a manner comparable to that which has been described for picking up this relay for restoration of signal 11 to stop, and when relay B is thus picked up, the stick circuits for the relays 12GZ and 12CGZ are both opened at back contact 337 of relay B and back contact 340 of the station relay 12ST so that either of these relays which has been picked up is restored to its dropped away position and in accordance therewith effects the restoration of other parts of the system in a manner corresponding to that which has been described as being effective upon the dropping away of the relay 11GZ which is associated with the signal 11.

*Auxiliary switch control.*—It is generally desirable in entrance-exit types of switch and signal control systems that means be provided whereby the track switches of any crossover or single track switch can be power operated independent of the setting up of a route by entrance-exit designation for purposes such as freeing the switch points from snow and ice and the like. Thus a three position toggle switch SML is generally provided on the panel of the control machine (see Fig. 1) for each crossover and for each single track switch for purposes of auxiliary switch operation.

The actuation of a switch control lever SML to its normal or reverse operating position, as compared to a neutral center position, provides for the picking up of corresponding normal and reverse switch position selecting relays, which in turn cause the normal and reverse switch control relays NWZ and RWZ to be correspondingly conditioned. Thus, for example, if an operator were to actuate the auxiliary switch control lever 2SML to its lower position for causing the power operation of the track switches of crossover 2 to their normal positions, the relays 2AN and 2BN would become energized, and the energization of these relays would require the relay 2NWZ to be energized in correspondence. If it is assumed that the lever 2SML is actuated to its lower position as viewed in Fig. 3A when the track switches of crossover 2 are unlocked and free to be operated, the relay 2AN is picked up by the energization of its lower winding through contact 396 of lever 2SML in its lower position and back contact 397 of relay 2R. Similarly, the lower winding of relay 2BN, which is more particularly associated with the track switch at the lower end of the crossover 2, is energized by a circuit including contact 398 of lever 2SML in its lower position and back contact 399 of relay 2R. With the relays 2AN and 2BN picked up, the switch control relay 2NWZ is energized in a manner which has been considered when considering the establishment of routes.

Having thus designated by the actuation of a switch control lever SML the particular position to which the track switches of a crossover or single track switch are to be operated, the operator then actuates the start button SPB (see Figs. 1 and 3D) for initiating the code communication system into operation for transmission of the switch control that has been designated.

If there has been no change in the position of the track switch from the position to which it has last been operated, of course there is no start of the communication system because there is no interruption in the stick circuit for the automatic start relay ACH associated with that track switch, but if the control called for is for operation of the associated track switch to its opposite position, the relay ACH for that track switch is dropped away in accordance with the change in the condition of the switch control relays NWZ and RWZ for that track switch, and subsequently upon actuation of the start push button SPB, the start relay CH for that track switch is picked up, and in turn the relay LC for that switch station is picked up to effect the transmission of a switch control in a manner corresponding to that which has been specifically described when considering the establishment of routes.

To consider a specific example of a start of the communication system under these conditions, if it is assumed that the track switches of crossover 2 have been called for to be operated from their normal to their reverse positions, the stick circuit for the relay 2—3ACH (see Fig. 3D) is interrupted at back contact 32 of relay 2RWZ, and the dropping away of relay 2—3ACH conditions a circuit for the upper winding of start relay 2—3CH so that relay 2—3CH is picked up upon the subsequent actuation of the push button SPB. The actuation of this button closes a circuit for the upper winding of relay 2—3CH extending from (+), including contact 400 of button SPB in its depressed position, back contact 401 of relay 2—3ACH and upper winding of relay 2—3CH, to (—). This relay when picked up provides for the energization of relay 2—3LC when the communication system is free for transmission of a control cycle for the associated station, and the communication of the switch control and the actual power operation of the track switches of crossover 2 to their reverse positions is accomplished in a manner comparable to that which has been heretofore described when considering the establishment of routes.

It has been pointed out that in case a switch control fails to be executed at the track layout in accordance with the code received by the bank of decoding relay CS, a normally energized correspondence relay WCP (see Fig. 6A) is dropped away to prevent the possible clearing of a signal over a wrong route. It is further provided that an indication as to the deenergized condition of this relay is transmitted to the control office according to the selections shown in Fig. 11 wherein the dropping away of the relay WCP interrupts the stick circuit for the normally energized change relay $CH^1$ by the shifting of contact 402, and thus initiates an indication cycle of operation during which the relay $LC^1$ is picked up. During this indication cycle, the circuit including front contact 403 of relay $LC^1$ and front contact 404 of relay WCP is opened at front contact 404 of relay WCP so that a character is selected for transmission during the associated channel of the indication cycle to actuate the magnetic stick relay WCK (see Fig. 3D) to its picked up position. The pick up of this relay energizes the out of correspondence indicator lamp WE on the control panel through front contact 405 and thus indicates to an operator that there has been a failure of the system to properly execute the control that has been transmitted for a track switch.

Upon observing the illumination of the lamp WE, the operator can then actuate the start button SPB and cause the retransmission of switch controls for all track switches in accordance with the positions that have been selected, and in this way an attempt may be made to rectify the error that has been made in the prior communication of a switch control.

The starting of the system for transmission for the respective switch stations in response to actuation of the start button SPB under these conditions is accomplished irrespective of the energized condition of all of the change relays ACH by reason of the closure of front contacts 406 and 407 of the relay WCK. Thus, upon the picking up of relay WCK, and the subsequent actuation of the start button SPB, the relay 2—3CH is picked up by the energization of its upper winding in a circuit extending from (+), including contact 400 of button SPB in its depressed position, front contact 406 of relay WCK and upper winding of relay 2—3CH, to (—). Similarly, the relay 4CH has its upper winding energized at the same time by a circuit extending from (+), and including contact 408 of button SPB in its depressed position front contact 407 of relay WCK and upper winding of relay 4CH, to (—). The relay 4LC is picked up in response to the relay 4CH and thus a control cycle is initiated for the transmission of the switch control for crossover 4, and subsequent to the transmission of that cycle, a second cycle is initiated by the picking up of relay 2—3LC because of the start relay 2—3CH having been energized. It is thus provided that a cycle is transmitted for each switch station under these conditions so that an attempt is made to bring the switch control application relays in the field into correspondence with the switch controls called for by the relays NWZ and RWZ for the associated track switches at the control office. If the out of correspondence condition is rectified by this retransmission of switch controls, the relay WCP (see Fig. 6A) is restored to its normally energized position in the field by a mode of operation comparable to that which has been described for its energization when considering establishment of routes, and the picking up of the relay WCP under these conditions effects the transmission of an indication cycle during which the switch correspondence indication relay WCK (see Fig. 3D) is actuated to its dropped away position to extinguish the switch correspondence indicator lamp WE by opening front contact 405.

Having thus described a switch and signal control system for a particularly simple track layout as one embodiment of the present invention, it is to be understood that this form has been selected for the purpose of facilitating the disclosure of the present invention particularly as to principles involved rather than limiting the number of forms which the invention may assume, and it is to be understood that the principles herein disclosed may be readily applied to different and more complex track layouts and various adaptations, alterations and modifications may be applied to the system which has been disclosed in accordance with the requirements of practice, without in any manner departing from the spirit or scope of the present invention except as limiting by the pending claims.

What I claim is:

1. A switch and signal control system of the entrance-exit type for establishing routes through a track layout respectively by automatically causing the power operation of track switches as required to establish each route having its entrance and exit ends designated comprising in combination, manually operable means for designation of the respective entrance and exit ends of each route, initiating means rendered active in response to designation of the respective entrance and exit ends of a route to be established, normal and reverse switch position selecting relays for each of the track switches, normal and reverse switch control relays for each of the track switches, completion circuit means rendered effective in response to said initiating means being rendered active for any route to be established for selectively energizing said normal and reverse switch position selecting relays for each track switch included in the route having its ends designed in accordance with the required position of that track switch to establish that route, said switch position selecting relays being energized in cascade starting with the switch position selecting relay for the track switch nearest the exit end of the route, circuit means effective to selectively energize said normal and reverse switch control relays for the respective track switches in response to the energization of the corresponding normal or reverse switch position selecting relays for the associated track switches, and said completion circuit means being effective to progress in cascade for energization of said switch position selecting relays for the respective track switches only so long as a corresponding normal or reverse switch control relay is energized for each normal or reverse switch position selecting relay that is energized as the cascade progresses.

2. A switch and signal control system for establishing any selected one of a plurality of routes through a track layout by automatically selecting the positions for power switches of crossovers and single track switches in response to designation of the respective entrance and exit ends of each route desired to be established comprising in combination, manually operable means for designating the respective entrance and exit ends of the respective routes, initiating means rendered active in response to designation of the respective entrance and exit ends of a route if that route is available for establishment, normal and reverse switch position selecting relays for each of the crossovers and for each of the single track switches, normal and reverse switch control relays for each of the crossovers and for each of the track switches for governing the power operation of the associated track switches, completion circuit means rendered effective in response to said initiating means being rendered active for any route to be established for selectively energizing said normal and reverse switch position selecting relays for the respective crossovers and single track switches having track switches included in that route in cascade starting with the switch position selecting relays for the track switch nearest the exit end of that route, circuit means effective to selectively energize said normal and reverse switch control relays for the respective crossovers and single track switches having track switches included in a route to be established in response to the energization of the switch position relay for that crossover or single track switch, and said completion circuit means being effective to progress in cascade for the respective single track switches and crossovers only so long as a corresponding normal or reverse switch control relay is energized for each normal or reverse switch position selecting relay that is energized.

3. A switch and signal control system of the entrance-exit type for a track layout having track switches affording a plurality of routes extending between route ends comprising in combination, manually operable means for designation of the respective entrance and exit ends of each route, initiating means rendered active in response to designation of the respective entrance and exit ends of any route available for establishment, normal and reverse switch position selecting relays for the respective track switches, normal and reverse switch control relays for the respective track switches, completion circuit means rendered effective in response to said initiating means being rendered active for any route for selectively energizing said normal or said reverse switch position selecting relay for each track switch included in that route in cascade starting with the switch position selecting relay for the track switch nearest the exit end of that route, circuit means for selectively energizing said normal and reverse switch control relays for the respective track switches having track switches included in a route in response to the energization of said switch position selecting relays for the corresponding track switches, said completion circuit means being effective to progress in cascade for energization of said switch position selecting relays for the respective track switches only so long as a corresponding normal or reverse switch control relay is energized for each normal or reverse switch position selecting relay that is energized as the cascade progresses, a route check relay for the entrance end of each route, circuit means including said completion circuit means for energizing said route check relay only provided that said normal and reverse switch position selecting and switch control relays are in correspondence when energized for the respective track switches in the route having its entrance and exit ends designated, and signal control means requiring the energization of said route check relay before a signal governing entrance to an associated route can be cleared.

4. A switch and signal control system for establishing respective routes through a track layout having track switches affording a plurality of routes extending between entrance and exit ends comprising in combination, manually operable means for designation of the respective entrance and exit ends of each route, initiating means rendered active in response to designation of the respective entrance and exit ends of a route to be established, normal and reverse switch position selecting relays for the respective track switches, normal and reverse switch control relays for the respective track switches, completion circuit means rendered effective in response to said initiating means being rendered active for any route to be established for selectively energizing said normal and reverse switch position selecting relays in correspondence with the normal and reserve positions required for the respective track switches with which such relays are associated for the establishment of the route having its entrance and exit ends designated, circuit means effective to selectively energize said switch control relays for the track switches in each route having its entrance and exit ends designated in correspondence with said normal and reverse switch position selecting relays for the corresponding track switches, said completion circuit means being effective to progress in cascade for energization of said switch position selecting relays for the respective track switches only so long as a corresponding normal or reverse switch control relay is energized for each normal or reverse switch position selecting relay that is energized as the cascade progresses, a route check relay for the entrance end of each route, circuit means including said completion circuit means and contact selections by said switch control relays for energizing said route check relay only provided that said normal and reverse switch position selecting and switch control relays are in correspondence when energized for each track switch included in a route having its entrance and exit ends designated, and signal control means requiring the energization of said route check relay before a signal governing entrance to an associated route can be cleared.

5. In a switch and signal control system for establishing respective routes through a track layout by automatically selecting the positions for power switches of crossovers and single track switches in response to designation of the respective entrance and exit ends of each route desired to be established, manually operable means for designation of the respective entrance and exit ends of each route, initiating means rendered active in response to designation of the respective entrance and exit ends of a route to be established, normal and reverse switch position selecting relays for each of the crossovers and for each of the single track switches, normal and reverse switch control relays for each of the crossovers and for each of the single track switches for governing their power operation, completion circuit means rendered effective in response to said initiating means being rendered active for any route to be established for selectively energizing said normal and reverse switch position selecting relays in correspondence with the positions of the respective track switches required for the establishment of that route, circuit means effective to selectively energize said switch control relays for the track switches in that route in response to the energization of the corresponding normal or reverse switch position selecting relays for the corresponding track switches, said completion circuit means being effective to progress in cascade for energization of said switch position selecting relays for the respective track switches only so long as a corresponding normal or reverse switch control relay is energized for each normal or reverse switch position selecting relay that is energized as the cascade progresses, a route check relay for the entrance end of each route, circuit means including said completion circuit means for energizing said route check relay only provided that said normal and reverse switch position selecting and switch control relays are checked in correspondence for each crossover and each single track switch having a track switch included in a route which has been designated emanating from that entrance point, and signal control means requiring the energization of said route check relay before a signal governing entrance to an associated route can be cleared.

6. A switch and signal control system of the entrance-exit type for a track layout having track switches affording a plurality of routes extending between signals defining the ends of the routes comprising in combination, manually operable means for designation of the respective entrance and exit ends of each route, initiating means rendered active in response to designation of the respective entrance and exit ends of a route to be established, normal and reverse switch position selecting relays for the respective track switches, normal and reverse switch control relays for the respective track switches, completion circuit means rendered effective in response to said initiating means being rendered active for a route having its entrance and exit ends designated for selectively energizing said normal and reverse switch position selecting relays in correspondence with the respective normal and reverse position required for the respective track switches in the establishment of that route, said normal and reverse switch position selecting relays being energized in cascade, starting with the switch position selecting relay for the track switch nearest the exit end of the route, circuit means for selectively energizing said normal and reverse switch control relays in correspondence with the switch positions selected by the energization of said normal and reverse switch position selecting relays, a route check relay for the entrance end of each route, circuit means including said completion circuit means for energizing said route check relay when a route has been designated emanating from that entrance point only provided that corresponding normal and reverse switch position selecting relays and switch control relays are energized for each track switch included in that route, and signal control means for permitting the clearing of each signal when a route is established emanating from that signal as an entrance point only provided that said route check relay for that entrance point is energized.

7. A switch and signal control system for a track layout having crossovers and single track switches for selectively establishing any desired one of a plurality of routes extending between entrance and exit points comprising in combination, manually operable means for designating the respective entrance and exit ends of each route to be established, initiating means rendered active in response to designation of the entrance and exit ends of a route to be established if that route is available for establishment, normal and reverse switch position selecting relays for each of the respective crossovers and single track switches, normal and reverse switch control relays for each of the crossovers and each of the single track switches for governing their power operation, completion circuit means rendered effective in response to said initiating means being rendered active for any route to be established for selectively energizing said normal and reverse switch position selecting relays in correspondence with the positions required of their associated crossovers and single track switches to set up the route extending between the entrance and exit ends that have been designated, circuit means effective to selectively energize said normal and reverse switch control relays for the respective crossovers and single track switches in correspondence with the energization of said normal and reverse switch position selecting relays, a check relay for the entrance end of each route, circuit means including said completion circuit means for energizing said check relay when a route has been designated emanating from that entrance point, only provided that corresponding normal and reverse switch position selecting relays and switch control relays are energized for each crossover or single track switch included in that route, and signalling means actuated to permit a clear indication to be displayed for governing the entrance to each route only provided that said route check relay for the entrance end of that route is energized.

8. A switch and signal control system of the entrance-exit type for a track layout having track switches affording a plurality of routes extending between entrance and exit ends comprising in combination, manually operable means for designation of the respective entrance and exit ends of each route desired to be established, route selecting means responsive to the designation of the respective entrance and exit ends of each route containing a plurality of track switches for selecting the normal and reverse positions required for each track switch included in that route, switch control means for the respective normal and reverse positions of each of the track switches energized in response to said route selecting means and in correspondence with the switch positions selected thereby, said route selecting means being effective to progress for the respective track switches in cascade, only so long as said switch control means is correspondingly conditioned for the associated track switches as the cascade progresses, a route check relay for each of the entrance points, circuit means for energizing said route check relay subsequent to the designation of the entrance and exit ends of a route containing a plurality of track switches and emanating from the associated entrance point only provided that said route selecting means and said switch control means have been conditioned to select the corresponding position for each track switch included in that route, and signal control means requiring the energization of said route check relay before a signal governing entrance to an associated route can be cleared.

9. A switch and signal control system of the entrance-exit type for a track layout remote from a control office having track switches affording a plurality of routes extending between entrance and exit points comprising in combination, manually operable means at the control office for designation of the respective entrance and exit ends of the routes, route selecting means responsive to the designation of the respective entrance and exit ends of each route for selecting the respective normal and reverse positions required for each track switch included in that route, a start relay for each of a plurality of track switches, stick circuit means for maintaining said start relay energized irrespective of the operation of said route selecting means for a route including the associated track switch except when said route establishing means selects a different position for the track switch with which that stick relay is associated than was last selected, a normally at rest code communication system connecting the control office and the track layout, and means for initiating said code communication system into a separate cycle of operation for each of said start relays that is deenergized by reason of its stick circuit means being opened by said route selecting means.

10. A switch and signal control system for a track layout remote from a control office having track switches affording a plurality of routes extending between entrance and exit route ends comprising in combination, manually operable means at the control office for designation of the respective entrance and exit ends of the routes, route selecting means responsive to the designation of the respective entrance and exit ends of each route for selecting the respective normal and reverse positions required for each track switch included in that route, switch control means for the normal and reverse positions of each of the track switches energized in response to the selection of a corresponding position for the associated track switch by said route selecting means, said switch control means being maintained as last energized until a change in its energization is called for by said route selecting means, a start relay for each of a plurality of the track switches, stick circuit means for maintaining said start relay energized until there is a change in the energization of said switch control means for the associated track switch, a normally at rest code communication system connecting the control office and the track layout, and means for initiating said code communication system into a separate cycle of operation for each of said start relays that is deenergized.

11. A switch and signal control system for a track layout remote from a control office having crossovers and single track switches affording a plurality of routes extending between entrance and exit ends comprising in combination, manually operable means at the control office for designation of the respective entrance and exit ends of the routes, route selecting means responsive to the designation of the respective entrance and exit ends of each route for selecting the normal or reverse position required for each track switch included in that route, a start relay for each of a plurality of crossovers and single track switches, stick circuit means for maintaining said start relay energized irrespective of the operation of said route selecting means except when said route selecting means selects a different position for the crossover or single track switch with which that start relay is associated than was last selected, a normally at rest code communication system connecting the control office and the track layout, and means for initiating said code communication system into a cycle of operation for the communication of a switch control from the control office to the track layout in response to the deenergization of said start relay.

12. A switch and signal control system of the entrance-exit type for a track layout remote from a controlling office having track switches affording a plurality of routes extending between entrance and exit points comprising in combination, manually operable means at the control office for designation of the respective entrance and exit ends of each route to be established, route selecting means responsive to the designation of the respective entrance and exit ends of each route for selecting the normal or reverse position required for each track switch included in that route, normal and reverse switch control relays for each track switch, circuit means for selectively energizing said normal and reverse switch control relays in correspondence with the position selecting for the associated track switches by said route selecting means, stick circuit means for maintaining each of said switch control relays energized until a different switch position is selected for the associated track switch by said route selecting means, a start relay for each of a plurality of track switches, stick circuit means including contact selections by said switch control relays for the associated track switch for maintaining said start relay energized irrespective of the actuation of said route selecting means associated with that track switch except when said route selecting means selects a position for the associated track switch different than the position that had been last selected by said route selecting means, a normally at rest code communication system connecting the control office and the track layout, and means for initiating said code communication system into a cycle of operation for the communication of a switch control from the control office to the track layout in response to the deenergization of said start relay for the associated track switch.

13. A switch and signal control system of the entrance-exit type for a track layout remote from a control office having track switches affording a plurality of routes extending between entrance and exite route ends comprising in combination, manually operable means at the control office for designation of the respective entrance and exit route ends, route selecting means responsive to the designation of the respective entrance and exit ends of each route for selecting the respective normal or reverse positions required for each track switch included in that route, normal and reverse switch control relays for each of the track switches, circuit means for selectively energizing said normal and reverse switch control relays in correspondence with the positions selected for the associated track switches by said route selecting means, stick circuit means for maintaining each of said normal and reverse switch control relays energized until a new position for the associated track switch is called for by said route selecting means, a start relay for each of a plurality of track switches, stick circuit means including selections by said switch control relays for maintaining said start relay energized irrespective of the operation of said route selecting means in selecting a route through the associated track switch except when said route selecting means selects a different position for that track switch than had been last selected, a normally at rest code communication system connecting the control office and the track layout, means for initiating said code communication system into a separate cycle of operation for each of said stick relays that is deenergized by reason of its stick circuit means being open, and means including contacts of said switch control relays for determining the code characters to be transmitted during the respective cycles of operation of said code communication system that are initiated by reason of the deenergization of said start relays.

14. A switch and signal control system of the entrance-exit type for a track layout remote from a control office having a plurality of track switches affording a plurality of routes extending between entrance and exit route ends comprising in combination, manually operable means for designating the respective entrance and exit ends of each route to be established, initiating means rendered active in response to designation of the respective entrance and exit ends of a route that is available for establishment, completion circuit means responsive to said initiating means being rendered active for selecting the positions of all track switches included in each route having its entrance and exit ends designated, normal and reverse switch control relays for the respective track switches, circuit means for selectively energizing said switch control relays in correspondence with the respective normal and reverse positions selected by said completion circuit means for the associated track switches and maintaining said switch control relays energized until a different position is selected by said completion circuit means for the associated track switch, said completion circuit means being effective to progress for the selection of the positions of the respective track switches in cascade, only so long as said switch control means is correspondingly conditioned for the associated track switches as the cascade progresses, a route check relay for the entrance end of each route, circuit means including said completion circuit means for energizing said route check relay only provided that one of said switch control relays has been energized for each track switch included in a route being established emanating from that entrance point in correspondence with the switch position selected by said completion circuit means, a start relay for each of a plurality of track switches, stick circuit means for maintaining said start relay energized except when there is a change in the condition of energization of said normal and reverse switch control relays for an associated track switch, a normally at rest code communication system connecting the control office and the track layout, and means for initiating said code communication system into a separate cycle of operation for each of said stick relays that is energized for the transmission of a selected signal control.

15. A switch and signal control system of the entrance-exit type for a track layout remote from a control office having track switches affording a plurality of routes extending between entrance and exit route ends defined by signal locations comprising in combination, manually operable means at the control office for designation of the respective entrance and exit ends of the routes, route selecting means responsive to the designation of the respective entrance and exit ends of each route for selecting the respective normal and reverse positions required for each track switch included in that route, switch control means for the respective normal and reverse positions of each track switch energized in correspondence with the respective normal and reverse positions for the associated track switches selected by said route selecting means, a route check relay for each of said signal locations, circuit means for energizing said route check relay only provided that said route selecting means and switch control means have been conditioned in correspondence in response to designation of the entrance and exit ends of a route emanating from the associated signal location, a start relay for each of a plurality of the track switches, stick circuit means for maintaining said start relay energized until there is a change in the condition of said switch control means for the associated track switch, a normally at rest code communication system connecting the control office and the track layout, and means for initiating said code communication system into a separate cycle of operation for each of said start relays that is deenergized and for each of said route check relays that is energized.

16. A switch and signal control system of the entrance-exit type for a track layout remote from a control office having track switches providing a plurality of routes extending between entrance and exit route ends defined by the location of signals comprising in combination, manually operable means at the control office for designation of the respective entrance and exit ends of the routes, route selecting means responsive to the designation of the respective entrance and exit ends of each route for selecting the respective normal and reverse positions required for each track switch included in that route, switch control means for the normal and reverse positions of each track switch selectively energized in correspondence with the respective normal and reverse position selected for the respective track switches by said route selecting means, a route check relay for governing the clearing of each signal, circuit means for energizing said route check relay only provided that said switch control means has been energized in correspondence with said route selecting means for each track switch included in a route having its entrance and exit ends designated and emanating from that entrance point, a normally at rest code communication system connecting the control office and the track layout, and means for initiating said code communication system into a cycle of operation for the communication of a control to clear the signal governing entrance to a route only provided that said route check relay for the corresponding entrance route end is energized.

17. In a centralized traffic control system in which switch and signal controls are communicated by code pulses from a control office to a remote track layout for the control of switches and signals during separate cycles of operation of a normally at rest code communication system, normal and reverse switch control relays at the track layout, stick circuit means for maintaining said normal or said reverse switch control relays in correspondence with the last switch position called for by a control communicated from the control office, decoding means at the track layout distinctively conditioned for respective code characters received over the code communication system from the control office, said decoding means being effective to energize said switch control relays in correspondence with respective normal and reverse switch controls for their associated track switches that are received from the control office, a correspondence relay at the track layout, circuit means for maintaining said correspondence relay steadily energized only provided that said switch control means is energized in correspondence with each switch control code received by said decoding means for its control, and signal control means for permitting a signal to clear governing entrance to a route in response to a signal control communicated over the code communication system from the control office during a cycle of operation separate from a cycle for the control or track switches only provided that said correspondence relay is energized at the time when the signal control is received.

18. A centralized traffic control system for the control of track switches and signals at a track layout remote from a control office wherein the respective switch and signal controls are communicated by a normally at rest code communication system during separate cycles of operation comprising in combination, decoding means at the track layout distinctively conditioned for respective code characters received over the code communication system from the control office, switch control means at the track layout distinctively conditioned to govern the respective normal or reverse positions of the respective track wsitches in accordance with switch control codes received by said decoding means from the control office, correspondence checking means for checking that said switch control means is selectively conditioned for the control of the respective track switches in accordance with the switch control codes that are decoded by said decoding means, and signal control means for clearing the signal governing entrance to a route in accordance with a signal code control communicated from the control office, said signal control means being rendered effective to permit the clearing of a signal only provided that the response of said switch control means to switch control codes transmitted during a prior cycle of operation of the code communication system was checked by said correspondence means as being in correspondence with the switch control codes communicated from the control office.

19. A switch and signal control system of the entrance-exit type for establishing respective routes through a track layout remote from a control office by automatically providing power operation of track switches as required to establish such routes in response to designation of the respective entrance and exit ends of each route as defined by signals disposed along the track way comprising in combination, manually operable means for designation of the respective entrance and exit ends of each route to be established, said manually operable means for designation of the entrance ends having stay-where-put normal and actuated positions, route selecting means responsive to the designation of the respective entrance and exit ends of each route for selecting the normal or reverse position required for each track switch included in that route, a route check relay for the entrance end of each route, circuit means for energizing said route check relay in response to said route selecting means being rendered effective to select the positions of the respective track switches of a route emanating from that entrance point, said circuit means being effective to maintain said check relay energized only until passage of a train past that entrance point, a normally at rest code communication system connecting the control office and the track layout effective when initiating to transmit a selected signal control during a cycle of operation, and initiating means at the control office for setting said code communication system into operation, said initiating means being rendered effective after said route selecting means has become effective in response to the manual designation of the respective entrance and exit ends of a route to be established, and said initiating means being effective automatically in response to deenergization of said check relay by a train entering the route provided that said manually operable means for the associated entrance point is in its actuated position, whereby a signal clearing control can be automatically transmitted subsequent to the passage of each of a plurality of trains.

THOMAS J. JUDGE.

References Cited in the file of this patent

UNITED STATES PATENTS

| Number | Name | Date |
|---|---|---|
| 2,121,847 | Wight | June 28, 1938 |
| 2,223,126 | Phinney | Nov. 26, 1940 |
| 2,265,259 | Wynn | Dec. 9, 1941 |
| 2,344,728 | Preston et al. | Mar. 21, 1944 |
| 2,592,704 | Jerome et al. | Apr. 15, 1952 |